(12) United States Patent
Cawlfield et al.

(10) Patent No.: US 8,694,995 B2
(45) Date of Patent: *Apr. 8, 2014

(54) APPLICATION INITIATED NEGOTIATIONS FOR RESOURCES MEETING A PERFORMANCE PARAMETER IN A VIRTUALIZED COMPUTING ENVIRONMENT

(75) Inventors: Kevin J. Cawlfield, Austin, TX (US); Chang W. Chen, Austin, TX (US); Mitchell P. Harding, Austin, TX (US); Michael C. Hollinger, Round Rock, TX (US); Michael R. Reddock, Jersey City, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/325,332

(22) Filed: Dec. 14, 2011

(65) Prior Publication Data

US 2013/0159997 A1 Jun. 20, 2013

(51) Int. Cl.
*G06F 9/455* (2006.01)
*G06F 9/50* (2006.01)

(52) U.S. Cl.
USPC .............................................. 718/1; 718/104

(58) Field of Classification Search
None
See application file for complete search history.

(56) References Cited

U.S. PATENT DOCUMENTS

| | | |
|---|---|---|
| 4,825,358 A | 4/1989 | Letwin |
| 5,050,072 A | 9/1991 | Earnshaw et al. |
| 5,237,694 A | 8/1993 | Horne et al. |
| 5,347,636 A | 9/1994 | Ooi et al. |
| 5,367,473 A | 11/1994 | Chu et al. |
| 5,408,629 A | 4/1995 | Tsuchiya et al. |
| 5,463,755 A | 10/1995 | Dumarot et al. |
| 5,506,987 A | 4/1996 | Abramson et al. |
| 5,513,126 A | 4/1996 | Harkins et al. |
| 5,517,622 A | 5/1996 | Ivanoff et al. |
| 5,539,883 A | 7/1996 | Allon et al. |
| 5,548,728 A | 8/1996 | Danknick |
| 5,555,417 A | 9/1996 | Odnert et al. |
| 5,603,029 A | 2/1997 | Aman et al. |

(Continued)

OTHER PUBLICATIONS

U.S. Appl. No. 13/325,487, filed Dec. 14, 2011, Kevin J Cawlfield, International Business Machines Corporation, 66 pages.

(Continued)

*Primary Examiner* — Jennifer To
*Assistant Examiner* — Benjamin Wu
(74) *Attorney, Agent, or Firm* — Matthew W. Baca; Amy J. Pattillo

(57) ABSTRACT

A hypervisor negotiates to reserve at least one available local resource in a host system that meets a performance parameter for at least one resource specified in a reservation request by a particular logical partition from among one or more logical partitions of virtualized pools of resources managed by the hypervisor in the host system, wherein the at least one performance parameter is specified by a particular application initiating the reservation request. The hypervisor, responsive to determining that the at least one available resource is not available in the host system, negotiates for offers to migrate the particular logical partition to at least one other host system comprising at least one available remote resource that meets the performance parameter, wherein the at least one other host system is managed by at least one other hypervisor that manages one or more other logical partitions of virtualized pools of resources.

12 Claims, 12 Drawing Sheets

(56) References Cited

U.S. PATENT DOCUMENTS

| | | | |
|---|---|---|---|
| 5,619,671 A | 4/1997 | Bryant et al. | |
| 5,689,553 A | 11/1997 | Ahuja et al. | |
| 5,689,642 A | 11/1997 | Harkins et al. | |
| 5,745,778 A | 4/1998 | Alfieri | |
| 5,765,033 A | 6/1998 | Miloslavsky | |
| 5,774,660 A | 6/1998 | Brendel et al. | |
| 5,802,146 A | 9/1998 | Dulman | |
| 5,826,084 A | 10/1998 | Brooks et al. | |
| 5,862,329 A | 1/1999 | Aras et al. | |
| 5,937,185 A | 8/1999 | Weir et al. | |
| 5,953,338 A | 9/1999 | Ma et al. | |
| 5,963,522 A | 10/1999 | Yamamuro | |
| 5,983,329 A | 11/1999 | Thaler et al. | |
| 5,987,118 A | 11/1999 | Dickerman et al. | |
| 6,014,545 A | 1/2000 | Wu et al. | |
| 6,049,823 A | 4/2000 | Hwang | |
| 6,356,929 B1 | 3/2002 | Gall et al. | |
| 6,427,071 B1 | 7/2002 | Adams et al. | |
| 6,442,664 B1 | 8/2002 | Maynard et al. | |
| 6,480,918 B1 | 11/2002 | McKenney et al. | |
| 6,557,091 B2 | 4/2003 | Houldsworth | |
| 6,578,033 B1 | 6/2003 | Singhal et al. | |
| 6,587,938 B1 | 7/2003 | Eilert et al. | |
| 6,678,797 B2 | 1/2004 | Chauvel et al. | |
| 6,718,387 B1 | 4/2004 | Gupta et al. | |
| 6,751,221 B1 | 6/2004 | Saito et al. | |
| 6,816,905 B1 | 11/2004 | Sheets et al. | |
| 7,145,898 B1 | 12/2006 | Elliott | |
| 7,203,944 B1 | 4/2007 | van Rietschote et al. | |
| 7,310,684 B2 | 12/2007 | Patrick et al. | |
| 7,698,430 B2 | 4/2010 | Jackson | |
| 7,725,559 B2 | 5/2010 | Landis et al. | |
| 7,743,233 B2 | 6/2010 | Wang et al. | |
| 7,877,754 B2 | 1/2011 | Birkestrand et al. | |
| 8,307,362 B1* | 11/2012 | Gong et al. | 718/1 |
| 2001/0049741 A1 | 12/2001 | Skene et al. | |
| 2002/0016812 A1 | 2/2002 | Uchishiba et al. | |
| 2002/0107901 A1 | 8/2002 | Hay | |
| 2002/0156962 A1 | 10/2002 | Chopra et al. | |
| 2002/0194496 A1 | 12/2002 | Griffin et al. | |
| 2003/0037223 A1 | 2/2003 | Steely et al. | |
| 2003/0099192 A1 | 5/2003 | Scott et al. | |
| 2003/0105796 A1 | 6/2003 | Sandri et al. | |
| 2003/0163642 A1 | 8/2003 | Borkenhagen et al. | |
| 2003/0191838 A1 | 10/2003 | Tsao | |
| 2003/0208647 A1 | 11/2003 | Kumar et al. | |
| 2004/0044718 A1* | 3/2004 | Ferstl et al. | 709/200 |
| 2004/0073759 A1* | 4/2004 | Arimilli et al. | 711/163 |
| 2004/0107199 A1* | 6/2004 | Dalrymple et al. | 707/100 |
| 2004/0163085 A1 | 8/2004 | Dillenberger et al. | |
| 2005/0039183 A1 | 2/2005 | Romero et al. | |
| 2005/0120160 A1 | 6/2005 | Plouffe et al. | |
| 2005/0160423 A1* | 7/2005 | Bantz et al. | 718/1 |
| 2005/0246505 A1 | 11/2005 | McKenney et al. | |
| 2006/0005198 A1* | 1/2006 | Uchishiba et al. | 718/104 |
| 2006/0010443 A1 | 1/2006 | Lahti et al. | |
| 2006/0020565 A1 | 1/2006 | Rzevski et al. | |
| 2006/0143617 A1* | 6/2006 | Knauerhase et al. | 718/104 |
| 2006/0155633 A1* | 7/2006 | Fellenstein et al. | 705/37 |
| 2006/0195715 A1* | 8/2006 | Herington | 714/4 |
| 2006/0212333 A1 | 9/2006 | Jackson | |
| 2006/0224741 A1* | 10/2006 | Jackson | 709/226 |
| 2006/0230149 A1 | 10/2006 | Jackson | |
| 2007/0028244 A1 | 2/2007 | Landis et al. | |
| 2007/0061441 A1 | 3/2007 | Landis et al. | |
| 2007/0204266 A1* | 8/2007 | Beaty et al. | 718/1 |
| 2008/0034365 A1 | 2/2008 | Dahlstedt | |
| 2008/0071854 A1* | 3/2008 | Gall et al. | 709/201 |
| 2008/0148254 A1 | 6/2008 | Hofer et al. | |
| 2008/0155100 A1* | 6/2008 | Ahmed et al. | 709/226 |
| 2008/0222638 A1* | 9/2008 | Beaty et al. | 718/100 |
| 2008/0222659 A1* | 9/2008 | Brumme et al. | 719/320 |
| 2008/0320269 A1 | 12/2008 | Houlihan et al. | |
| 2009/0100248 A1* | 4/2009 | Kami | 712/30 |
| 2010/0094948 A1 | 4/2010 | Ganesh et al. | |
| 2010/0250892 A1* | 9/2010 | Logan et al. | 711/173 |
| 2011/0029675 A1 | 2/2011 | Yeow et al. | |
| 2011/0145392 A1 | 6/2011 | Dawson et al. | |
| 2012/0054744 A1* | 3/2012 | Singh et al. | 718/1 |
| 2013/0159998 A1 | 6/2013 | Cawlfield et al. | |
| 2013/0160007 A1 | 6/2013 | Cawlfield et al. | |
| 2013/0160008 A1 | 6/2013 | Cawlfield et al. | |

OTHER PUBLICATIONS

U.S. Appl. No. 13/552,333, filed Jul. 18, 2012, In re Kevin J Cawlfield, International Business Machines Corporation, 57 pages.

U.S. Appl. No. 13/551,521, filed Jul. 17, 2012, In re Kevin J Cawlfield, International Business Machines Corporation, 56 pages.

Oleszkiewicz, John, et al., "Parallel Network RAM: Effectively Utilizing Global Cluster Memory for Data-Intensive Parallel Programs", not dated, accessed on Dec. 1, 2011 online from citeseerx.ist.psu.edu/viewdoc/download?doi=10.1.1.102.2927&rep=rep1&type=pdf, 8 pages.

Chen, Songqing, et al., "Dynamic Load Sharing With Unknown Memory Demands in Clusters," Proceedings of the 21st International Conference on Distributed Computing Systems, 2001, accessed on Dec. 1, 2011 online from citeseerx.ist.psu.edu/viewdoc/download-?doi=10.1.1.23.8896&rep=rep1&type=pdf, 10 pages.

Batley, John E, et al., "IBM PowerVM Live Partition Mobility", Mar. 2009, ibm.com/redbooks, 308 pages.

Devenish, Stuart, et al., "IBM PowerVM Virtualization Introduction and Configuration", Jun. 2011, ibm.com/redbooks, 600 pages.

Non-Final Office Action, mailing date Mar. 16, 2011, U.S. Appl. No. 11/941,315, filed Nov. 16, 2007, In re Gall, International Business Machines Corporation, 10 pages.

Final Office Action, mailing date Aug. 31, 2011, U.S. Appl. No. 11/941,315, filed Nov. 16, 2007, In re Gall, International Business Machines Corporation, 9 pages.

Notice of Allowance, mailing date Sep. 10, 2012, U.S. Appl. No. 11/941,315, filed Nov. 16, 2007, In re Gall, International Business Machines Corporation, 8 pages.

Ex Parte Quayle, mailing date Aug. 12, 2004, U.S. Appl. No. 10/268,727, filed Oct. 10, 2002, In re Arimilli, International Business Machines Corporation, 5 pages.

Notice of Allowance, mailing date Sep. 13, 2004, U.S. Appl. No. 10/268,727, filed Oct. 10, 2002, In re Arimilli, International Business Machines Corporation, 8 pages.

Non-final Office Action, mailing date Aug. 22, 2011, U.S. Appl. No. 12/125,457, filed May 22, 2008, In re Beaty, International Business Machines Corporation, 11 pages.

Non-final Office Action, mailing date Feb. 21, 2012, U.S. Appl. No. 12/125,457, filed May 22, 2008, In re Beaty, International Business Machines Corporation, 11 pages.

Final Office Action, mailing date Sep. 5, 2012, U.S. Appl. No. 12/125,457, filed May 22, 2008, In re Beaty, International Business Machines Corporation, 18 pages.

Notice of Allowance, mailing date Jul. 31, 2013, U.S. Appl. No. 12/125,457, filed May 22, 2008, In re Beaty, International Business Machines Corporation, 5 pages.

Non-Final Office Action, U.S. Appl. No. 13/552,333, filed Jul. 18, 2012, In re Kevin J. Cawlfield, mailing date Jun. 20, 2013, 54 pages.

Notice of Allowance, U.S. Appl. No. 13/552,333, filed Jul. 18, 2012, In re Kevin J. Cawlfield, mailing date Nov. 20, 2013, 40 pages.

Non-Final Office Action, mailing date Jan. 31, 2014, U.S. Appl. No. 13/325,487, filed Dec. 14, 2011, In re Cawlfield, International Business Machines Corporation, 76 pages.

Non-Final Office Action, mailing date Jan. 31, 2014, U.S. Appl. No. 13/551,521, filed 07-187-2012, In re Kevin J. Cawlfield, International Business Machines Corporation, 70 pages.

* cited by examiner

APPLICATION INITIATED NEGOTIATIONS FOR RESOURCES MEETING A PERFORMANCE PARAMETER IN A VIRTUALIZED COMPUTING ENVIRONMENT

BACKGROUND

1. Technical Field

This invention relates in general to computing environments and more particularly to application initiated negotiations for resources meeting a performance parameter in a virtualized computing environment within a virtualized host system and among multiple virtualized remote host systems.

2. Description of the Related Art

In a virtualized host system, a hypervisor may manage the allocation of resources into one or more logical partitions, or virtual machine, each representing a separate logical grouping of resources assigned to an instance of an operating system, upon which an application or workload runs. When an application running in a particular logical partition sends a memory allocation request to an operating system in a logical partition, if the logical partition cannot satisfy the resource request with free memory, the operating system rejects the resource request or satisfies the resource request using a performance tradeoff of paging items to disk, which slows down memory accesses.

BRIEF SUMMARY

In view of the foregoing, there is a need for a system and program product to enable an application to initiate a negotiation for resources meeting a performance parameter in a computing environment within a virtualized host system and among multiple virtualized remote host systems.

In one embodiment, a logically partitioned host system includes one or more logical partitions of pools of virtualized resources and an operating system is operated in each of the logical partitions. The host system includes a hypervisor operative on the host system to manage the one or more logical partitions of pools of virtualized resources and operative to negotiate to reserve at least one available local resource in the host system that meets a performance parameter for at least one resource specified in a reservation request by a particular logical partition from among the one or more logical partitions, wherein the at least one performance parameter is specified in the reservation request by a particular application initiating the reservation request from the particular logical partition. In addition, the host system includes the hypervisor, responsive to determining that the at least one available resource is not available in the host system, operative to negotiate for offers to migrate the particular logical partition to at least one other host system comprising at least one available remote resource that meets the performance parameter, wherein the at least one other host system is managed by at least one other hypervisor for managing at least one other logical partition comprising at least one other pool of virtualized resources.

In another embodiment a computer program product manages requests for resources, wherein the computer program product is tangibly embodied in a computer-readable storage medium. The computer program product includes computer executable instructions which cause a computer to negotiate, by a hypervisor, to reserve at least one available local resource in a host system that meets a performance parameter for at least one resource specified in a reservation request by a particular logical partition from among one or more logical partitions of virtualized pools of resources managed by the hypervisor in the host system, wherein the at least one performance parameter is specified by a particular application initiating the reservation request from the particular logical partition. In addition, the computer program product includes computer executable instructions which cause a computer, responsive to determining that the at least one available resource is not available in the host system, to negotiate, by the hypervisor for offers to migrate the particular logical partition to at least one other host system comprising at least one available remote resource that meets the performance parameter, wherein the at least one other host system is managed by at least one other hypervisor that manages one or more other logical partitions of virtualized pools of resources.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
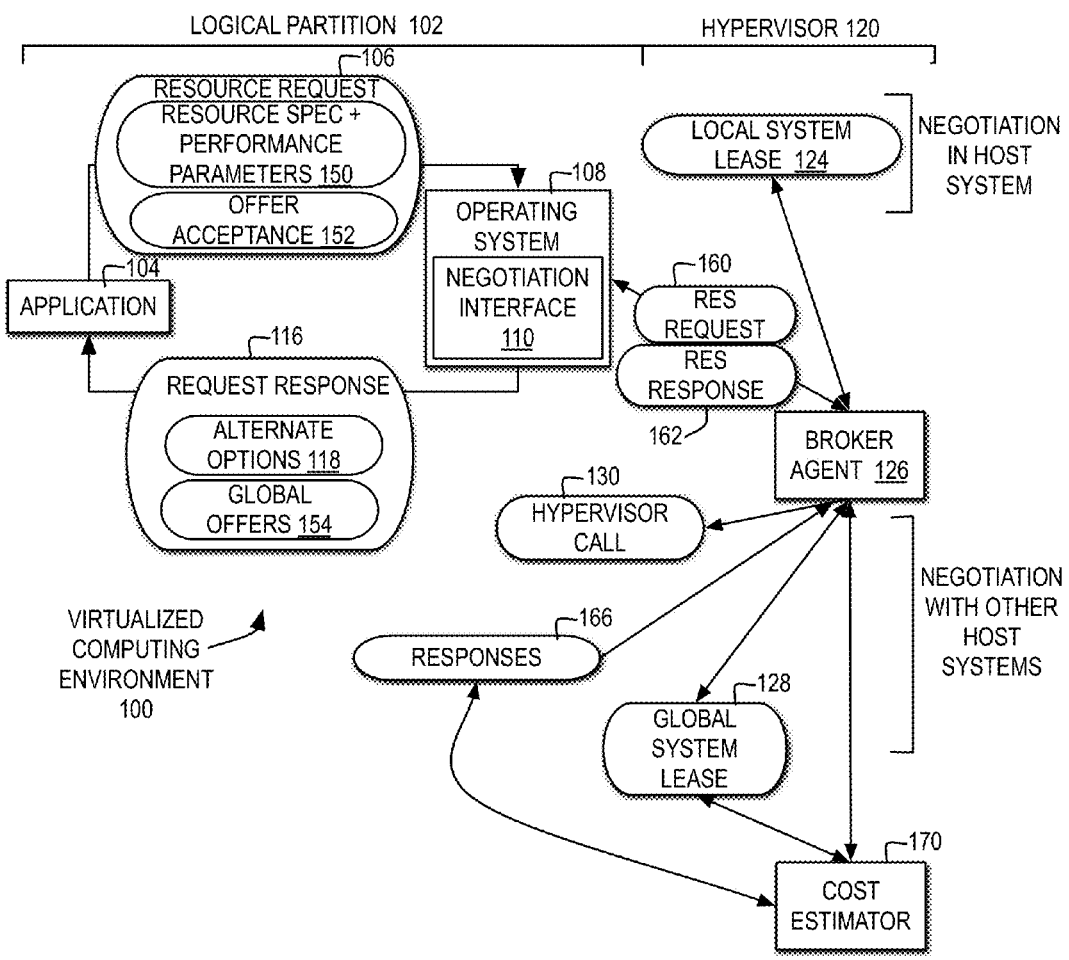
FIG. 1 is a block diagram illustrating one example of a virtualized computing environment in which a hypervisor manages negotiations for resources meeting at least one performance parameter, including quality of service, within the host system and among remote host systems for an application from an application initiated request for resources specifying the performance parameter.

With reference now to the Figures, and in particular with reference now to FIG. 1, a block diagram illustrates one example of a virtualized computing environment in which a hypervisor manages negotiations for resources meeting at least one performance parameter, including quality of service, within the host system and among remote host systems for an application from an application initiated request for resources specifying the performance parameter.

In the example, a virtualized computing environment 100 may include one or more types of virtualized environments, including, but not limited to, a workload distribution environment, a cloud computing environment, a grid environment, a cluster environment, and other types of computing environments implementing one or more virtualization layers using one or more types of virtual machines or systems for managing virtualized resources. In one example, one or more host systems are identified within virtualized system environment 100, where each host system is virtualized by including one or more logical partitions or virtual machines, such as logical partition 102, managed by a hypervisor 120 or other firmware for managing a virtualization layer, such as a virtualization layer of resources virtualized into partitioned, logical pools of resources. In one example, logical partition 102 represents a partitioned, virtual group of one or more hardware, software, and firmware resources currently configured in logical partition 102 by hypervisor 120 from one or more computing systems. In one embodiment, a host system refers to a system in which a hypervisor, such as hypervisor 120, manages at least one logical partition, and the remote host systems or other host systems refers to other virtualized systems managed by other hypervisors instances independent of hypervisor 120.

Hypervisor 120 manages at least one of partitioning of resources to logical partitions, the sharing of resources between logical partitions, the dynamic movement of resources between logical partitions, the distribution of workloads across logical partitions, the movement of workloads from one partition to another logical partition, and the migration of workloads and partitions from one host system to another host system within virtualized system environment 100. In addition, hypervisor 120 may communicate with other hypervisors of other hosts systems organized within virtualized system environment 100 for peer-to-peer communication or may communicate with other host systems through a management interface.

In one example, operating system 108 within logical partition 102 manages requests for resources from application 104 and manages the allocation of specific resources for application 104. One of ordinary skill in the art will appreciate that operating system 108 may represent a kernel and may include a resource management unit specified for monitoring resource usage within logical partition 102, requesting additional resources from hypervisor 120, and managing the use of resources within logical partition 102.

In one embodiment, application 104 submits one or more resource requests, such as resource request 106, to operating system 108, specifying one or more resource requirements for application 104. Application 104 may represent one or more instances of an application or may represent one or more workloads scheduled to run or running on an application.

In one embodiment, resource request 106 may request a lease of one or more types and amounts of resources and may specify one or more performance parameter requirements, as illustrated at reference numeral 150. Performance parameters may include, but are not limited to, a lease start time, a lease duration, a desired quality of service (QoS), a resource locality, and a cost. In one example, a lease start time may specify "now" and may specify one or more future times. In one example, a lease duration may specify a particular time or may specify a workload estimation. In one example, a desired QoS may specify a particular type of resource, a particular option for a resource, or other values that indicate a quality of service for a particular type of resource. In one example, a resource locality may specify "local" for a local host system, "global" for use of local host systems and other host systems, "migration" for use of other host systems, and other indicators limiting resource locations. In one example, "cost" may specify a price, a particular number of units of usage, or other value that indicates a charge for use of a resource. In another example, "cost" may also specify a cost profile that should be applied to satisfy a resource request.

In the example, operating system 108 sends a request response 116 that specifies whether resource request 106 is locally granted, meeting the specified performance parameters, or whether resource request 106 is locally declined. In addition, response to request 116 may include, if a request is declined, alternate options 118, specifying recommended adjustments for one or more of the performance parameters or global offers 154 including one or more of offers for migrating application 104 to a remote host system.

In one example, for operating system 108 to handle resource request 106 as a negotiation to lease resources from application 104, operating system 108 includes a negotiation interface (NI) 110 that provides an application programming interface (API) and controller for processing resource request 106 from application 104, where resource request 106 includes resource specifications and performance parameters 150. NI 110 receives resource request 106, filters resource request 106 to determine whether resource request 106 is a request to initiate a negotiation for resources meeting performance parameters, and formats resource request 106 into a resource reservation request format accepted by hypervisor 120, as illustrated by reservation (res) request 160. By application 104 specifying resource request 106 to call negotiation interface 110, application 104 is enabled to initiate a negotiation for resources, both locally and remotely, that meet specific performance parameters as set by application 104, rather than ceding to the performance parameters selected by operating system 108, hypervisor 120, or other component.

In one example, negotiation interface 110 of operating system 108 receives resource request 106 and operating system 108 queries a broker agent 126 with res request 160 to negotiate for local resources to be moved to logical partition 102 meeting the performance parameters of resource request 106 from the host system. Broker agent 126 may consult local or internal tables for resources managed in the host system to determine the availability of resources within the host system. As illustrated, if broker agent 126 determines that resource request 106 can be satisfied locally, then operating system 108 schedules a reservation of the available resources, illustrated as a local system lease 124, in host system 132 for resource request 106 and returns a reservation (res) response 162 indicating the granting of local system lease 124. In addition, hypervisor 120 coordinates with operating system 108 to transfer resources to fulfill local system lease 124 during the lease period for the duration of the lease. Operating system 108 returns request response 116 to application 104 indicating the resource request has been locally granted and allocates the resources leased to logical partition 102 during the lease period, to application 104.

In addition, in one example, if the performance parameters in resource request 106 specify a locality that includes remote host resources and if broker agent 126 determines that resource request 106 cannot be satisfied within the host system, broker agent 126 makes a peer-to-peer hypervisor call 130 that sends resource request 106 directly to one or more hypervisors of other, remote host systems. Broker agent 126 waits for a period of time for responses by other host systems to the hypervisor call, collects any responses 166 to the hypervisor call, and evaluates any responses from other host systems to the hypervisor call. Broker agent 126 selects one or more of the responses from other host systems as the best offer for migrating application 104 and passes the offer for migrating application 104 to operating system 108 in res response 162. Operating system 108 returns the offer to application 104 in global offers 154. If application 104 accepts the offer for migrating application 104, application 104 calls negotiation interface 110 to accept the offer, as illustrated by offer acceptance 152, operating system 108 passes the offer acceptance to broker agent 126 in res request 160, and broker agent 126 begins brokering the migration of application 104 to the remote host system with the accepted offer. In one example, application 104 may initially submit resource request 106 that automatically authorizes migration, and broker agent 126 will automatically start migrating application 104 to the remote host system with the selected offer.

Broker agent 126 may determine, from among responses 166, the one or more responses with the best offers from other host systems, according to one or more policies, and establish a lease of the resources on the other host system, illustrated as global system lease 128. Broker agent 126 controls migration of application 104 alone or of logical partition 102 to the other host system during the least time specified in global system lease 128.

Broker agent 126 may also determine, if one or more of the local host system and other host systems cannot satisfy one or more of the performance parameters in resource request 106, whether alternate resources are available that do not meet all the performance parameters in resource request 106, but reduce or omit one of performance parameter values. If alternate resources are available that do not meet all the performance parameters in resource request 106, operating system 108 may identify one or more options for performance parameters to use the alternate resources and return the options as one or more alternate options 118 to return to application 104 with response to request 116. In one example, alternate options 118 may include codes designated by operating system 108 to identify one or more parameters that need to be adjusted or errors in the resource request.

When application 104 receives alternate options 118 or global offers 154 in response to resource request 106, application 104 may accept global offers 154 or adjust the performance parameter requirements and resubmit resource request 106. In one example, application 104 may adjust the performance parameter requirements for a resource lease according to alternate options 118. In another example, application 104 may adjust the performance parameter requirements for a resource lease in view of alternate parameter recommendations, but also according to negotiation policies determined by application 104. For example, if alternate options 118 return a recommendation to reduce a quality of service value by 25%, application 104 may determine, based on negotiation policies, to reduce a quality of service value by a maximum amount of 10%, but to increase a value of another factor, such as cost or locality, in a resubmitted resource request. By application 104 receiving alternate options 118 or global offers 154, adjusting performance parameters in resource request 106 setting offer acceptance 152, and calling negotiation interface 110 with resource request 106, application 104 is enabled continue to negotiate within the local host system and with other host systems, for resources meeting performance requirements, as specified by application 104.

In addition, prior to broker agent 126 making hypervisor call 130, broker agent 126 may determine whether there are one or more other applications, identified within other logical partitions (LPARs) operating in the host system, which if the other LPAR were migrated to one of the other host systems, would release sufficient system resources of the host system to allow the host system to schedule resources for local system lease 124 for logical partition 102, in response to resource request 106. If there are one or more other LPARs operating in the host system, which if migrated to one of the other host systems, would release sufficient system resources of the host system to allow the host system to schedule local system lease 124 for logical partition 102, then broker agent 126 may send cost requests to a cost estimator 170 requesting estimated costs for migrating each of logical partition 102 and the other LPARs. Cost estimator 170 returns an estimated cost for migrating each of logical partition 102 and the other LPARs, and broker agent 126 selects which logical partition to migrate based on policies, such as choosing to migrate the logical partition with the lowest estimated migration cost. Once broker agent 126 selects which one or more logical partitions to attempt to migrate for the negotiation based on estimated migration costs, broker agent 126 sends hypervisor call 130 to the other host systems for the selected one or more logical partitions.

In the example, cost estimator 170 collects data related to migration costs of logical partitions to and from the host system from responses 166, global system lease 128, and broker agent 126, and stores the collected historical data in a history table for use in estimating costs of future logical partition migrations for broker agent 126. In addition, in the example, cost estimator 170 may select data from the history table that is relevant to the migration of an application or a logical partition out of the host system and attach the relevant historical cost data to a migration data header for the migrating LPAR, where the other host system receiving the migrating LPAR strips the migration data header from the migrating LPAR and also stores the relevant historical cost data for the LPAR migration in a history table for use by the cost estimator of the remote host system for calculating future LPAR migration cost estimates. By cost estimator 170 locally collecting and distributing historical cost data for LPAR migrations to and from the host system, cost estimator 170 is able to efficiently estimate costs for future LPAR migrations without requiring network bandwidth and other resource usage to query other host systems for estimated costs and cost estimator 170 is able to efficiently update other host systems in the peer-to-peer network with historical cost data for LPAR migrations.

In one example, migration costs collected by cost estimator 170 are based on migration cost inputs that may include, but are not limited to, network latency between systems, processor speeds of systems, processor utilization on each system, and a memory footprint of the partition. Cost estimator 170 collects the historical cost data for LPAR migrations from estimated values of the migration cost inputs prior to migration and real values of the migration cost inputs after the migration.

In the example, one or more components within a host system may control the migration of an LPAR to one of the other host systems using one or more techniques for controlling migrations to other host systems. Depending on the type of virtualized computing environment in which a host system is implemented, the host system may additionally or alternatively control migrations of different layers and groupings of virtualized components including applications, operating systems, workloads, and workload partitions.

In one example, application 104 may also submit resource request 106 without specifying one or more performance parameters, and cede to one or more of the performance parameters applied by operating system 108, hypervisor 120, or another host system to which application 104 is migrated. For example, application 104 may be a legacy application that does not have the functionality to specify performance parameters in a resource request or may not have the functionality to specify performance parameters for a selection of resources in a resource request. For example, application 104 may submit resource request 106 with a memory allocation request without any performance parameters that only specifies the size of the memory, such as a "malloc (size)" request. In one example, operating system 108 receives the "malloc (size)" request without any performance parameters specified and still negotiates on behalf of application 104 for memory of the "size" specified in the memory request, using the qual- ity of service implemented by operating system 108 or as applied by hypervisor 120. In one example, where operating system 108 determines the quality of service for the "malloc (size)" request, operating system 108 may determine there is insufficient memory in a shared memory pool to allocate for the resource request, but operating system 108 may apply a quality of service policy for a performance trade-off, such as memory paging, to satisfy the resource request. In another example, operating system 108 may automatically require a highest quality of service for fulfilling a memory request, when the performance parameter is not specified, and negotiate for real memory for application 104. In another example, operating system 108 may cede to the quality of service requirements provided by hypervisor 120. In one example, hypervisor 120 may apply a policy with a preference to migrate workloads within an ensemble of host systems.

In contrast to the previous example of application 104 submitting resource request 106 of "malloc (size)" without any performance parameters, as previously described with reference to resource specification and performance parameters 150, application 104 may initiate a negotiation for resources meeting performance parameters specified by application 104, such as by submitting a request using the command "malloc (size=X bytes, lease start time=now, lease duration=24 hours, quality of service=real memory, locality=anywhere, cost=10% cap, hidden)" where "lease start time, lease duration, quality of service, locality, and cost" are the performance parameters. In the example, the "quality of service" value specified in a memory allocation request may specify "real memory" to designate that memory paging is not acceptable and the "cost" value specified to "10% cap, hidden" may request a cap of any increased cost for memory meeting the other parameters at a cap of 10% of the regular fee and the "hidden" cost profile parameter may specify that the additional cap should be hidden from other host systems.

Figure 2:
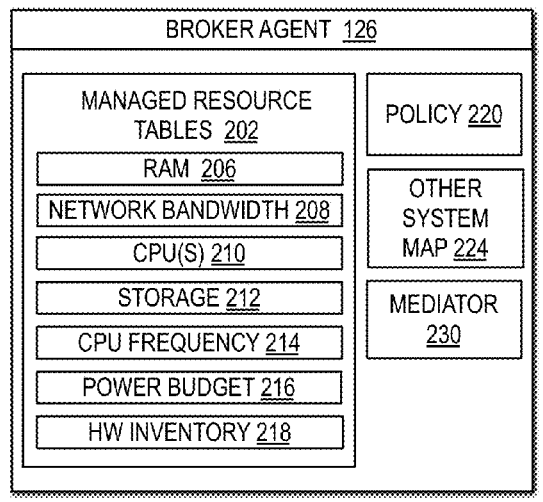
FIG. 2 is a block diagram illustrating one example of a broker agent for managing negotiations for resources meeting performance parameters in a virtualized computing environment.

With reference now to FIG. 2, a block diagram illustrates one example of a broker agent for managing negotiations for resources meeting performance parameters in a virtualized computing environment. In one example, broker agent 126 is implemented in the hypervisor or other virtual machine management layer.

In one example, broker agent 126 includes managed resource tables 202. Managed resource tables 202 may include tables or other data structures for managing the availability, use, location, reservations, and other aspects of one or more resources available in a host system. In the example, managed resource tables 202 include separate tables for each of RAM 206 for managing the distribution of memory within the host system, including shareable memory, network bandwidth 208 for managing the distribution of network resources within the host system, CPU(s) 210 for managing the distribution of processors within the host system, storage 212 for managing the distribution of disk space in the host system, CPU frequency 214 for managing distribution of processors based on processor frequency, power budget 216 for managing limits on power usage by applications and logical partitions in the host system, and HW inventory 218 for managing the hardware inventory files periodically stored from a scan of the hardware available in the host system.

Figure 3:
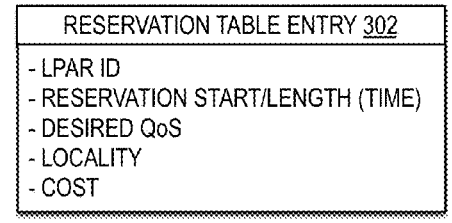
FIG. 3 is a block diagram illustrating one example of a reservation table entry for a reservation request mapped to a particular table within managed resource tables.

In one example, broker agent 126 receives reservation requests from an operating system of a logical partition, within the host system. Broker agent 126 first maps the reservation request to the appropriate, particular table within managed resource tables 202. For example, if the reservation request is for a memory allocation, then broker agent 126 maps the reservation request to RAM 206 within managed resource tables 202. FIG. 3 illustrates one example of a reservation table entry for a reservation request mapped to a particular table within managed resource tables 202. In the example, a reservation table entry 302 is entered in a table appropriate for the type of resource being requested. Elements of reservation table entry 302 may include, but are not limited to, an LPAR identifier (ID) identifying the LPAR of the operating system sending the reservation request, a reservation start time and length, a desired quality of service (QoS), a locality limitation, and a cost limitation.

Figure 4:
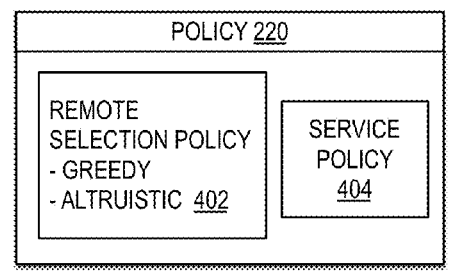
FIG. 4 is a block diagram illustrating one example of the one or more types of policy rules that may be specified in a policy applied by the broker agent.

Next, broker agent 126 determines whether there are resources available in the particular table within managed resource tables 202 that meet the performance parameters in the reservation request and meet the policy rules of policy 220. FIG. 4 illustrates one example of the one or more types of policy rules that may be specified in policy 220. If broker agent 126 determines there are resources available in the particular table that meet the performance requirements in the reservation request and that policy 220 allows use of the resources from the local host system, then broker agent 126 reserves the resource for the requesting logical partition and returns a reservation response to the operating system of the requesting logical partition that the reservation has been granted. The operating system returns a request response to the requesting application indicating that the request for resources has been granted.

In the event that broker agent 126 determines there are not resources available locally, in the particular table, that meet the performance requirements in the reservation request, then broker agent 126 may apply policy 220 to determine what additional negotiations to perform. In one example, policy 220 may include, in service policy 404, a policy that requires broker agent 126, in the event that the locality specification of a reservation request is specified as local, to still query cost estimator 170 with a cost request or to query remote host systems with a bid request, to determine whether to include a locality adjustment in alternate parameter recommendations 118. In another example, policy 220 may include, in service policy 404, a policy that requires broker agent 126, in the event that the locality specification of a reservation request is specified as local, to determine whether there is another LPAR in the host system, which if migrated, would free sufficient resources in managed resource tables 202 to provide sufficient local resources for a reservation request. If there is another LPAR in the host system, which if migrated, would free sufficient resources, service policy 404 may direct broker agent 126 to call cost estimator 170 or other host systems with a cost request for an estimated cost for migrating the other LPAR and a determination whether the migration is cost effective, or broker agent 126 may automatically broadcast a bid request to the other host systems.

In addition, if broker agent 126 determines there are not resources available locally and the locality setting of a reservation request allows for remote resourcing, service policy 404 may specify that broker agent 126 needs to broadcast a bid request to the other host systems. In addition, service policy 404 may further specify that broker agent 126 first needs to select which LPAR within the host system to select for the bid request, if there are other LPARs, which if migrated, would free sufficient resources in the host system to meet the resource request requirements and may also required that brokerage agent 126 submit cost requests for estimates of the cost of migrating each of the LPARs and select which LPAR to submit bid requests on behalf of for migration based on the estimated costs for migrating each LPAR. In the example, other system map 224 includes a mapping of the locations of one or more other host systems enabled to directly communicate through in a peer-to-peer management network. Broker agent 126 broadcasts a bid request for the reservation request to the other host systems according to other system map 224 and calls mediator 230 to manage the status and collection of outgoing requests and incoming responses.

Figure 5:
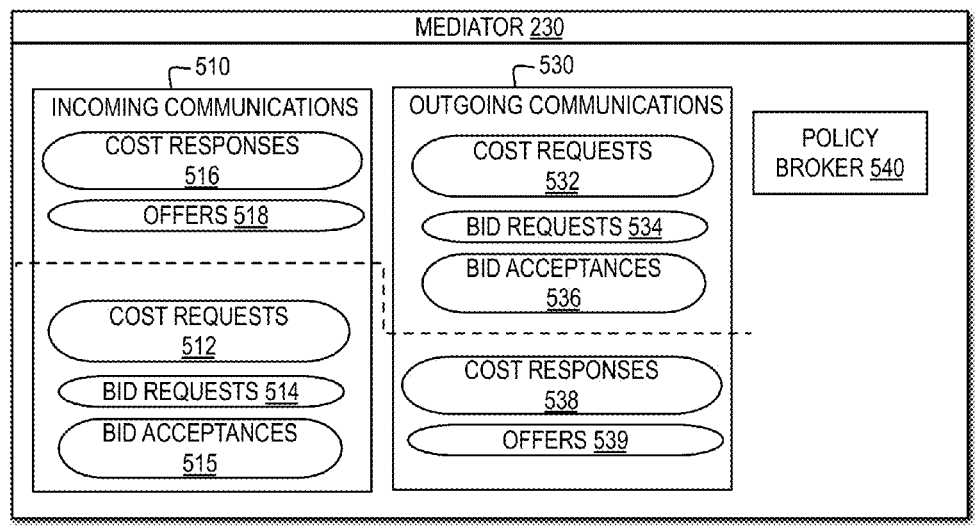
FIG. 5 is a block diagram illustrating a mediator called by a broker agent for managing the tracking of incoming communications from remote host systems and outgoing communications to remote host systems.

In one example, FIG. 5 illustrates a block diagram of a mediator 230 that includes data structures for managing incoming communications 510 and outgoing communications 530. In one example, outgoing communications 530 may include a record of bid requests 534 broadcast by broker agent 146 to multiple remote host systems requesting bids from the remote host systems for a reservation request and incoming communications 510 may include a record of offers 518 including bid offers received from the remote host systems for migrating a reservation request.

In one example, a policy broker 540 of mediator 230 tracks a time when each separate bid request of bid requests 534 is broadcast and waits a particular amount of time for collection of offers to each separate bid request of offers 518. Policy broker 540 collects all offers to a bid request and determines, based on workload, system preferences, and a remote selection policy 402 of policy 220, which responding remote host system to select to receive a particular application. Factors that may influence policy broker 540 in determining the best remote host system for a particular workload may include, but are not limited to, I/O requirements of the application, including CPU, memory usage, network bandwidth, and disk space requirements, power usage of the application, and hardware requirements, such as a particular adapter or hardware accelerator required for an application. Once broker agent 146 is approved to accept a particular offer, broker agent 146 sends a bid acceptance, recorded in bid acceptances 536, and acts as the broker for migrating the requesting application to a remote host system.

In another example, broker agent 146 may broadcast a cost request, tracked in cost requests 532, to other remote host systems, where the cost request queries other remote host systems for an estimated cost of what it would cost the other remote host systems to run an application, but is not a request for a remote host system place a bid committing to provide resources for a particular application. Policy broker 540 monitors for and records cost responses 516 from other remote host systems, responding to cost requests 532. In one example, broker agent 146 may periodically query other remote host systems with cost requests 532. In another example, broker agent 146 may query other remote host systems with cost request 532 when negotiating for resources for a particular reservation request.

In one example, broker agent 146 may additionally or alternatively broadcast a cost request, tracked in cost requests 532, to cost estimator 170, where the cost request queries cost estimator 170 of the host system for an estimated cost of what it would cost to migrate a particular LPAR to one or more other host systems based on historical cost data for previous LPAR migrations out of the host system to other host systems. Policy broker 540 may monitor for and collect cost responses 516 from cost estimator 170.

In addition, mediator 230 receives and records incoming communications 510 from other remote host systems requesting costs, bids, and bid acceptances, including cost requests 512, bid requests 514, and bid acceptances 515, and mediator 230 records outgoing communications 530 from the host system to one or more host systems including cost responses 538 and offers 539. For cost request 512 and bid requests 514, policy broker 540 queries broker agent 126 to determine a current cost for resources or to generate an offer to provide resources for a reservation request. Broker agent 126 may call cost estimator 170 to estimate a cost for migrating a LPAR to the host system based on historical cost data for previous LPAR migrations into the host system. Broker agent 126 sends a response to the request to the requesting remote host system and mediator 230 records the response to the request in cost responses 538 or offers 539. When policy broker 540 detects bid acceptances 515, policy broker 540 passes a reservation request to broker agent 126 to reserve the resources for the remote host system. During the reservation lease time, hypervisor 120 receives a migration of an application and moves the reserved resources to a logical partition hosting the application.

In particular, in one example, when policy broker 540 determines which responding remote host system to select to receive a particular application, policy broker 540 may apply remote selection policy 402 of "greedy" and spread the work evenly among the remote host systems that discount costs to attract work from other host systems in other system map 224. In another example, application 104 may specify a "cost" in resource request 106 of "greedy".

In addition, in one example, for policy broker 540 to assess costs associated with migration, policy broker 540 may apply remote selection policy 402 of "altruistic" and determine whether to give away one application to satisfy the resource needs of another application. In another example, application 104 may specify a "cost" in resource request 106 of "altruistic". For example, if broker agent 126 needs resources for application B to run locally, but all or a portion of the needed resources are in use locally by application A, the "altruistic" policy instructs broker agent 126 to send a cost query to remote host systems to estimate it would cost to run each of application A and application B. Policy broker 540 receives the cost estimations for running application A and application B remotely from the other host systems. Policy broker 540 may compare the sum cost of running application A remotely and application B locally with the sum cost of running application B remotely and application A locally and if the sum cost of running application B remotely and application A locally is greater, then policy broker 540 may decide to give away application A to the other host and broadcast an resource request for bids for application A, rather than application B, so that the local host system resources used by application A will be freed up for use by application B. Once policy broker 540 determines which application to send to the remote host system, then policy broker 540 triggers broker agent 146 to broadcast bid requests for the selected application to the remote host systems.

To apply the "altruistic" policy, policy broker 540 may request that broker agent 126 assess which applications within the host system, if migrated would free up sufficient resources for the requesting application, such as application B in the previous example, to run locally. In addition, to apply the "altruistic" policy, policy broker 540 may request that broker agent 126 assess which applications running within the host system require a lower QoS from the requesting application and then determining whether migrating any of these application would free up sufficient resources for the requesting application.

In the example, broker agent 126 may pass cost responses 516, offers 518, cost responses 538, and offers 539 to cost estimator 170 for storage in a history table. By storing cost responses and offers made by the host system and received from other host systems, cost estimator 170 maintains historical data about recent estimated and actual costs of migrating LPARs to and from a host system.

In the example, remote selection policy 402 and service policy 404 specified in policy 220, for each host system, are modular and configurable, such that each host system may apply separate policies for different types of resources and such that each host system may apply a different set of policies in policy 220 from any other host system in an ensemble of host systems. By specifying policy 220 by resource and by host system, each host system applies a set of policies specified for efficiently negotiating on behalf of applications based on an application initiated reservation request.

Figure 6:
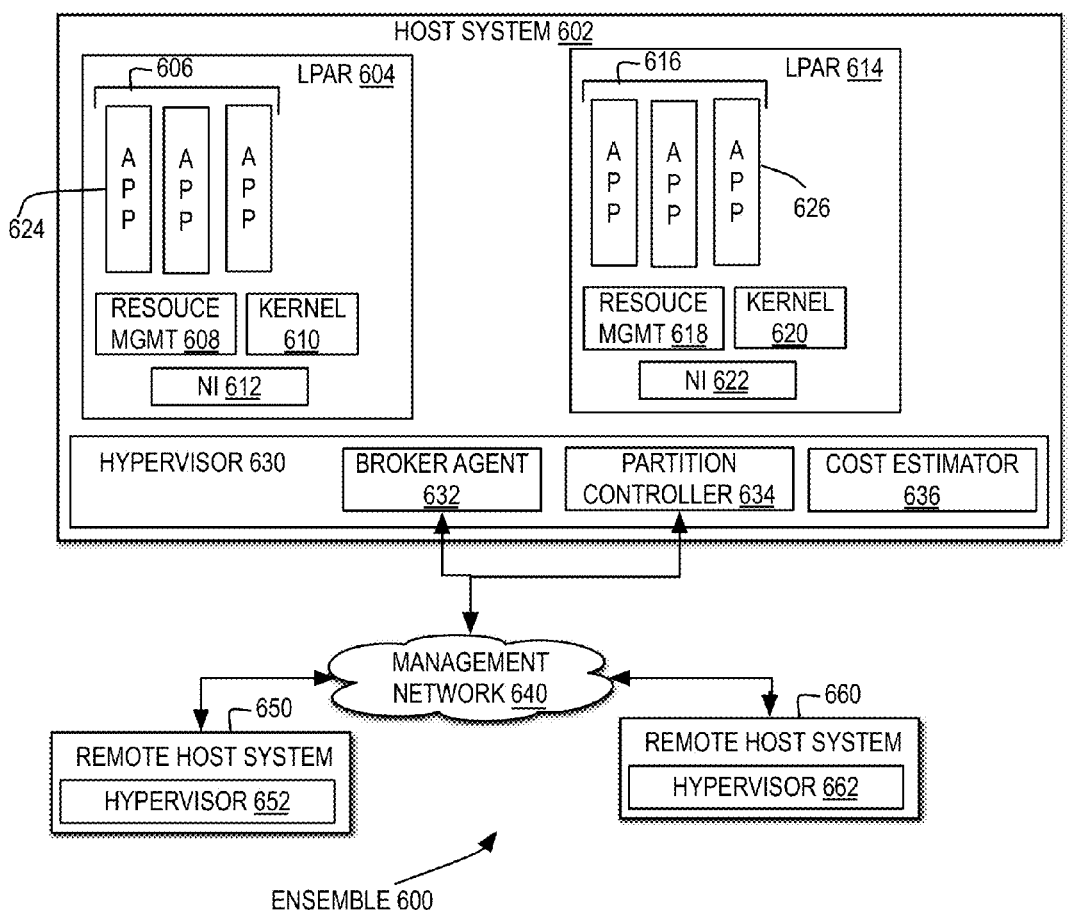
FIG. 6 is a block diagram illustrating one example of a ensemble including multiple virtualized host systems, each managed by a separate hypervisor instance.

With reference now to FIG. 6, a block diagram illustrates one example of a ensemble including multiple virtualized host systems, each managed by a separate hypervisor instance. In the example, ensemble 600 represents one type of virtualized computing environment, such as virtualized computing environment 100, and includes a host system 502, remote host system 650, and remote host system 660, communicatively connected through management network 640. In one example, management network 640 represents an established peer-to-peer network through which host system 620, remote host system 650, and remote host system 660 directly communicate and through which a group of systems within ensemble 600 run without a central management entity. In one example, ensemble 500 represents a pool of compatible host systems in which jobs can start on any host system, in which job workloads have mobility to be automatically moved from and managed in one host system to another host system, and in which each destination host system may volunteer to host job workloads.

In the example, host system 602 includes a hypervisor 630, remote host system 650 includes a hypervisor 652, and remote host system 660 includes a hypervisor 662. Each of hypervisor 630, hypervisor 652, and hypervisor 662 may perform one or more of the functions described with respect to hypervisor 120, and in particular may each perform one or more of the functions described with respect to broker agent 146. In the example, hypervisor 630 includes a broker agent 632 for controlling negotiations for resource reservations for logical partitions 604 and 614. In the example, logical partitions 604 and 614, which are managed by a partition controller 634 of hypervisor 630 in host system 602, are illustrated. One of ordinary skill in the art will appreciate that although not depicted, hypervisor 652 may manage at least one logical partition of remote host system 650 and hypervisor 662 may manage at least one logical partition of remote host system 660.

In the example, LPAR 604 includes multiple applications, illustrated at reference numeral 606, resource management 608, a kernel 610 and a negotiation interface (NI) 612. Resource management 608 may include one or more resource controllers, including memory management, which may be accessed by hypervisor 630 for monitoring use of resources within LPAR 604 and adjusting local records of resource allocations to LPAR 604. Kernel 610 may represent one instance of a guest operating system within LPAR 604. Similarly, LPAR 614 includes multiple applications illustrated at reference numeral 616, resource management 618, kernel 620, and negotiation interface 622.

In the example, negotiation interface 612 and negotiation interface 622 perform at least one of the functions described with reference to negotiation interface 110. For example, negotiation interface 612 may receive a resource request from application 624, format the resource request into a reservation request, and pass the reservation request to broker agent 632 of hypervisor 630. Broker agent 632 determines whether there are sufficient resources available for the reservation request on host system 602. If there are not sufficient resources available for the reservation request on host system 602, broker agent 632 broadcasts a call for bids to remote host system 650 and remote host system 660 through management network 640 and waits for offers from remote host system 650 and remote host system 660 with bids for migration of application 624 alone or LPAR 604, to the remote host system. If application 624 accepts a migration offer from one of the remote host systems, such as remote host system 650, then broker agent 632 manages the migration to the reserved resources on remote host system 650.

As illustrated, negotiation interface 612 may receive resource requests from multiple applications, however, the reservation requests sent by negotiation interface 612 to hypervisor 630 may only identify LPAR 604, and not the individual application initiating the request. Negotiation interface 612 may manage a table of outgoing requests indexed by application and upon receiving a response from hypervisor 630, match the response to the reservation request responded to, and identify the associated requesting application.

In the example, if broker agent 632 applies an "altruistic" policy, then, in one example, if application 624 submits a resource request and the resource request specifies resources that would be available locally if not used by application 626, broker agent 632 may determine whether it is more cost effective to migrate application 624, and thus LPAR 604, to one of remote host systems 650 and 660 or to migrate application 626, and thus LPAR 614, to one of remote host systems 650 and 660. In the example, if broker agent 632 applies a "greedy" policy, then broker agent 632 will evenly distribute work between remote host system 650 and remote host system 660, as each system is available to take work.

In another example, if locally satisfying a resource request by application 624 would cause an overcommitted state on host system 602, broker agent 632 may automatically initiate a partition migration operation for migrating LPAR 604 to one of remote host systems 650 and 660. In one example, an overcommitted state may be caused by application 624 requesting new memory pages that are not available in the memory currently allocated to LPAR 604 and additional memory is also not available within host system 602. In particular, policy 220 may include a setting that as soon as a host system cannot meet the memory needs of a partition for a new memory page request, policy 220 requires that the partition needs to be migrated. In one example, migration of LPAR 604 may include starting the migration with the new pages that application 624 requested and also using local swap space to store copies of local pages until the migration to a selected remote host, from among remote host system 650 or 660, is complete.

In the example, partition controller 634 may control the partition migration operation for migrating LPAR 604 or LPAR 614 to one of remote host systems 650 and 660 and may control the partition migration operation for migrating partitions into host system 602 from one of remote host systems 650 and 660. In one example, partition controller 634 controls communications between broker agent 632 and hypervisors 652 and 622 and controls partition migration operations responsive to broker agent 632 initiating partition migration operations. In controlling partition migration operations, partition controller 634 may implement one or more different types of migration functions to handle different types of migration scenarios and to optimize migration operations. In one example, partition controller 634 may manage the memory allocations, memory sharing, and memory paging on host system 602 during a migration of an LPAR to temporarily satisfy the memory requirements of an application while a partition migration occurs. In addition, while partition controller 634 is described with reference to migrating LPARs, in another embodiment, partition controller 634 may also migrate applications, workloads, workload partitions, or other individual and grouped virtualized components and partition controller 634 may also migrate virtualized components across multiple host systems.

Figure 7:
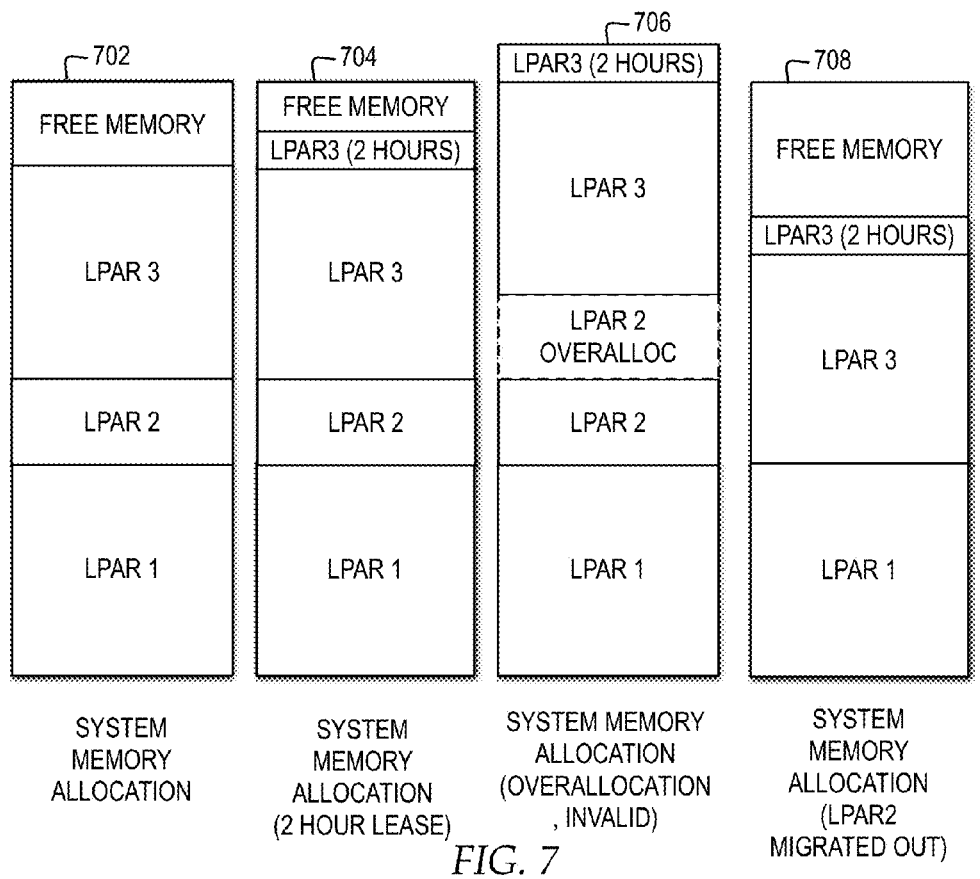
FIG. 7 is a block diagram illustrating one example of a broker agent managing local memory allocations and logical partition migrations, to provide memory meeting the quality of service requirements of one or more workloads.

With reference now to FIG. 7, a block diagram illustrates one example of a broker agent managing local memory allocations and logical partition migrations, to provide memory meeting the quality of service requirements of one or more workloads. In the example, as illustrated at reference numeral 702, in a first system memory allocation, the memory available in a host system is allocated between "LPAR 1", "LPAR 2", and "LPAR 3" or is available in as free memory. In the example, a workload in "LPAR 3" requests a lease of memory for two hours and broker agent 146 leases the memory to "LPAR 3" from the free memory, as illustrated at reference numeral 704. Next, in the example, a workload in "LPAR 2" requests additional memory and specifies a performance parameter of real memory, but the request requires a memory allocation that that is larger than the remaining free memory, which would result in an overallocation, as illustrated at reference numeral 706. Since broker agent 146 determines that the additional memory required by "LPAR 2" is not available locally, and the requesting application in "LPAR 2" requires real memory and an altruistic cost, broker agent 146 determines whether it is more cost effective to migrate "LPAR 2" to a remote host system or to migrate "LPAR 3" to a remote host system and free up the memory leased to "LPAR 3", to locally provide the memory required by "LPAR 2". In the example, broker agent 146 determines that it is more cost effective to migrate "LPAR 2" to a remote host system and "LPAR 2" approves the offer to migrate to a remote host to receive the requested real memory.

Figure 8:
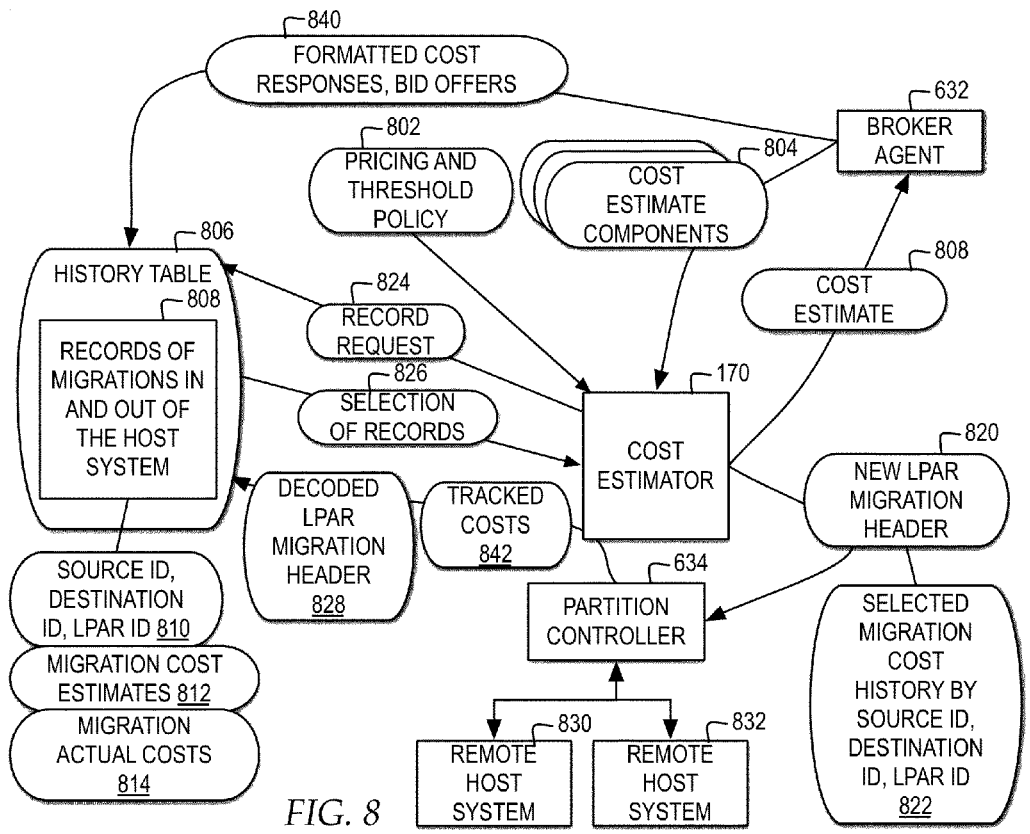
FIG. 8 is a block diagram illustrating one example of a cost estimator implemented for estimating costs for migrating logical partitions based on historical data captured from previous migrations of logical partitions.

FIG. 8 illustrates one example of a block diagram of a cost estimator implemented for estimating costs for migrating logical partitions based on historical data captured from previous migrations of logical partitions. In the example, when broker agent 632 needs cost estimates for migration an LPAR to a remote host system, broker agent 632 submits cost estimate components 804 to cost estimator 170, where each of cost estimate components 804 may specify one or more of a remote host system and a target LPAR, for which cost estimates are requested. In addition, cost estimate components 804 may include requests for costs including, but are not limited to, network latency between systems, size of the partition in a byte based measurement, size of the partition based on the number of CPUs, and the rate at which the partition is touching any pages of memory. In one example, the rate at which the partition is touching any pages of memory effects migration latency because a partition that is touching a high number of pages will take longer to migrate than a partition that is touching a lower number of pages. Cost estimator 170 receives cost estimate components 804 and searches a history table 806 for records relevant to each of cost estimate components 804.

In one example, history table 806 includes records of the costs associated with migrations in and out of the host system, as illustrated at reference numeral 808. In one example, each record may include one or more types of information including, but not limited to, a source ID of the host system, a destination ID of a remote host system, such as a remote host system 380 or a remote host system 832, and an LPAR ID of a migrating LPAR, as illustrated at reference numeral 810, migration cost estimations 812, or migration actual costs 814. In one example, migration cost estimates 812 may include cost responses tracked by broker agent 632 and migration actual costs 814 may include bid offers tracked by broker agent 632, where broker agent 632 formats and stores cost responses and bid offers in history table 806 as illustrated at reference numeral 840, and actual migration costs 842 tracked by partition controller 634 for migrations into and out of the host system. In one example, actual migration costs 842 may include the tracked network latency between systems for the migration, the amount of memory or number of CPUs migrated, and other data indicating one or more types of resource costs of migrating logical partitions between systems. In one example, one or both of the target system partition controller tracks the actual migration costs of migrating an LPAR to the target system. In another example, the source system partition controller may receive a communication from the target system partition controller at the conclusion of an LPAR migration, where the closing communication includes the actual costs for migration of the LPAR, as tracked by the target system partition controller. In addition, migration cost estimates 812 and migration actual costs 814 may include records from decoded LPAR migration headers by cost estimator 170 from incoming LPAR migrations, as illustrated by decoded LPAR migration header 828.

In one example, cost estimator 170 detects one or more records within history table 806 that apply to current cost estimate components 804 and cost estimator 170 applies one or more of the policies specified in pricing and threshold policy 802 to prioritize the records and calculate an estimated cost for migrating an LPAR. In the example, cost estimator 170 returns the estimated cost as cost estimate 808 to broker agent 632. In one example, broker agent 632 may submit cost estimate components 804 for multiple LPAR migrations and compare cost estimate 808 returned for each LPAR to estimate which LPAR may be the least expensive to migrate to a remote host system, such as remote host system 830 or remote host system 832. As number complexity and size of a computing environment grows, the number of metrics applied by cost estimator 170 in calculating estimated costs and the weight given to each metric by cost estimator 170 in calculating estimated costs is modular and configurable. For example, as the complexity and size of a computing environment grows, cost estimator 170 may apply a greater weight to network latency costs in calculating the estimated costs of migrating an LPAR.

In one example, pricing and threshold policy 802 includes at least one pricing policy, where pricing policies may be specified for particular resources and specified for the particular host system. Examples of pricing policies within pricing and threshold policy 802 may include, but are not limited to, an average pricing policy, an optimist pricing policy, and a pessimist pricing policy. Cost estimator 170 applies an average pricing policy by selecting the mean of the selection of historical data identified in history table 806. Cost estimator 170 applies an optimistic pricing policy by selecting the best case of the selection of historical data identified in history table 806. Cost estimator 170 applies a pessimist pricing policy by selecting the worst case of the selection of historical data identified in history table 806.

In one example, when broker agent 632 selects to migrate an LPAR from the host system to one or remote host systems 830 or 832, broker agent 632 directs partition controller 634 to control the migration of the selected LPAR. Partition controller 634 receives the LPAR migration call and calls cost estimator 170 with a request for a migration header for the migrating LPAR. Cost estimator 170 receives migration header requests and searches history table 806 for a selection of the latest relevant migration records for the target LPAR and the destination remote host system. The number of latest relevant migration entries selected may be specified for the type of resource, the LPAR, the destination remote host system, or other searchable parameter. Cost estimator 170 encodes a new migration data header 820 with the selected migration entries, identified by one or more of a source ID, a destination ID, or an LPAR ID, as illustrated at reference numeral 822, and returns the new migration data header to partition controller 634. In addition, cost estimator 170 deletes a selection of older entries about the LPAR based on a configured threshold number of entries to maintain, as specified in pricing and threshold policy 802. When partition controller 634 receives new migration data header 820 with historical cost data, for an LPAR migration, partition controller 634 encodes the LPAR migration with the migration data header and begins the migrations of the LPAR to the selected destination remote host system from among remote host systems 830 and 832. In addition, cost estimator 170 may send a decoded LPAR migration header 828 of new LPAR migration header 820, for storage in history table 806, such that history table 806 includes a record of the selected migration cost for the LPAR migration out of the host system.

In one example, when partition controller 634 receives migrations of LPARs from one or more of remote host systems 830 and 832, partition controller 634 the LPAR migration may include a migration data header with migration historical cost data. Partition controller 634 strips the LPAR migration header from incoming LPAR migrations and cost estimator 170 decodes the LPAR migration header and sends a decoded LPAR migration header 828 to history table 806 for storage, such that history table 806 includes a record of historical migration costs for LPAR migrations into the host system.

In the example, by storing historical cost data for LPAR migrations out of and into a host system in history table 806, historical cost information is available for cost estimator 170 to efficiently estimate a cost of migrating LPARs based on previous historical costs when broker agent 632 requires cost estimates to determine which LPAR to attempt to request migration bids for, from remote host systems. In the example, by including historical cost data for LPAR migrations in a migration data header with an LPAR migration, the historical cost data in history table 806 is efficiently updated at the remote host system receiving a migration for use in estimated future migration costs.

In the embodiment illustrated, each host system in an ensemble, communicatively connected in the peer-to-peer network environment, implements a local cost estimator 170 and maintain a local history table 806. In another embodiment, the host systems in an ensemble may access a single system that hosts cost estimator 170 and history table 806 for the ensemble.

Figure 9:
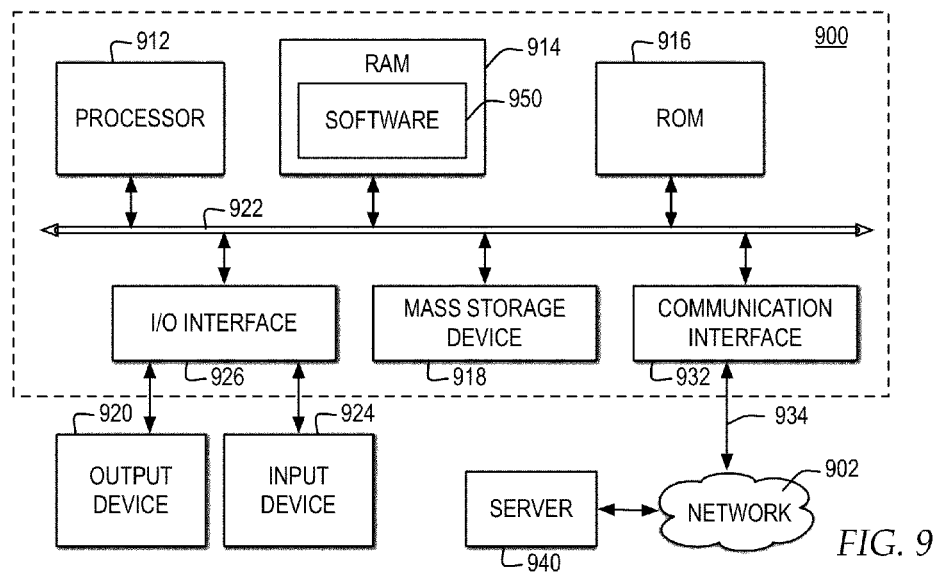
FIG. 9 is a block diagram illustrating one example of a schematic of a computer system in which the present invention may be implemented.

FIG. 9 illustrates one example of a schematic of a computer system in which the present invention may be implemented. The present invention may be performed in a variety of systems and combinations of systems, made up of functional components, such as the functional components described with reference to computer system 900 and may be communicatively connected to a network, such as network 902. In one example, each of host system 602, remote host system 650, and remote host system 660 may each implement one or more instances of functional components of computer system 900. In another example, computer system 900 may represent one or more cloud computing nodes.

Computer system 900 includes a bus 922 or other communication device for communicating information within computer system 900, and at least one hardware processing device, such as processor 912, coupled to bus 922 for processing information. Bus 922 preferably includes low-latency and higher latency paths that are connected by bridges and adapters and controlled within computer system 900 by multiple bus controllers. When implemented as a server or node, computer system 900 may include multiple processors designed to improve network servicing power. Where multiple processors share bus 922, additional controllers (not depicted) for managing bus access and locks may be implemented.

Processor 912 may be at least one general-purpose processor such as IBM® PowerPC® (IBM and PowerPC are registered trademarks of International Business Machines Corporation) processor that, during normal operation, processes data under the control of software 950, which may include at least one of application software, an operating system, middleware, and other code and computer executable programs accessible from a dynamic storage device such as random access memory (RAM) 914, a static storage device such as Read Only Memory (ROM) 916, a data storage device, such as mass storage device 918, or other data storage medium. Software 950, including operating system and application software, may include, but is not limited to, code, applications, protocols, interfaces, and processes for controlling one or more systems.

Figure 10:
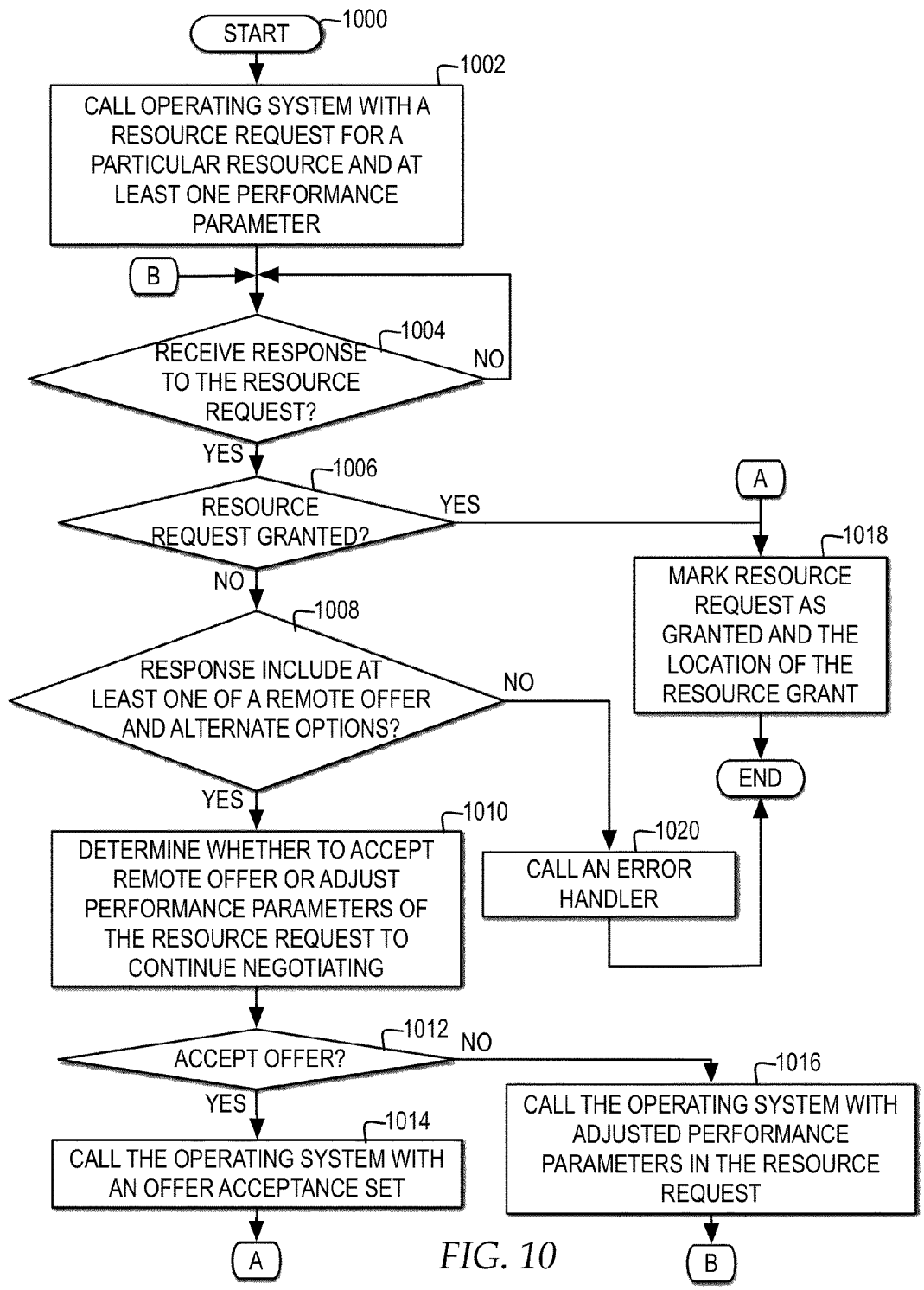
FIG. 10 is a high level logic flowchart illustrating one example of a process and program for managing application initiated negotiations for resources with a specified performance parameter.
Figure 11:
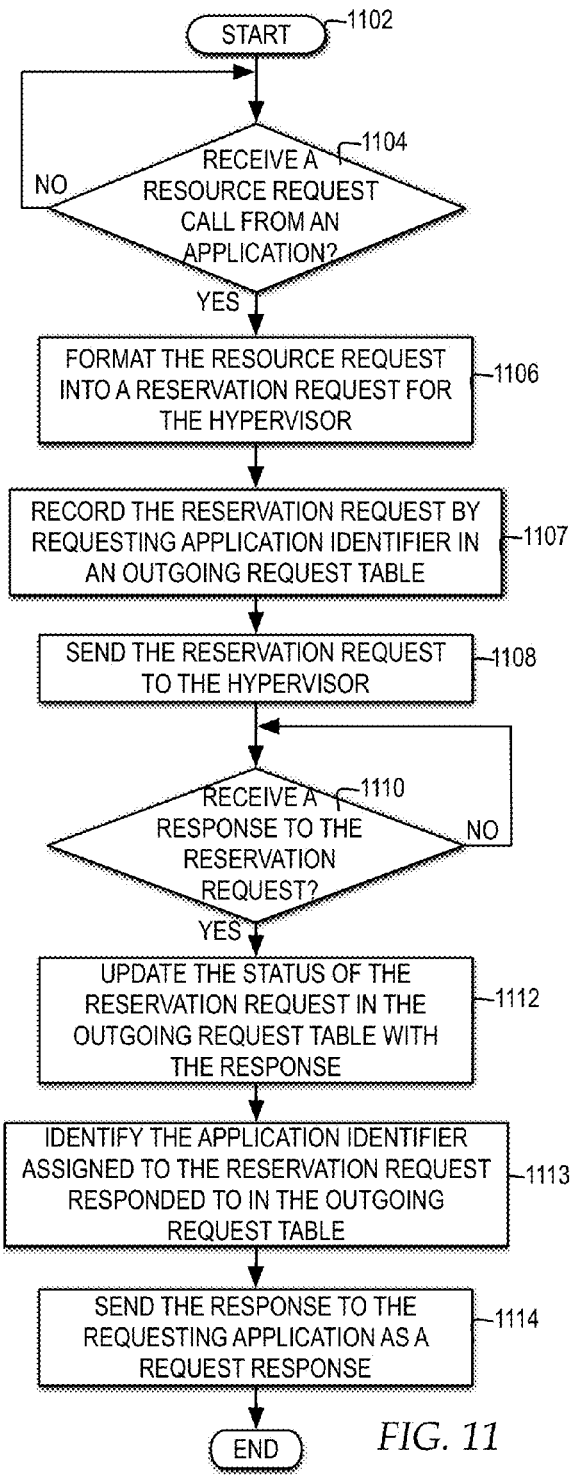
FIG. 11 is a high level logic flowchart illustrating one example of a process and program for a negotiation interface of an operating system managing application initiated negotiations for resources meeting performance parameters.
Figure 12:
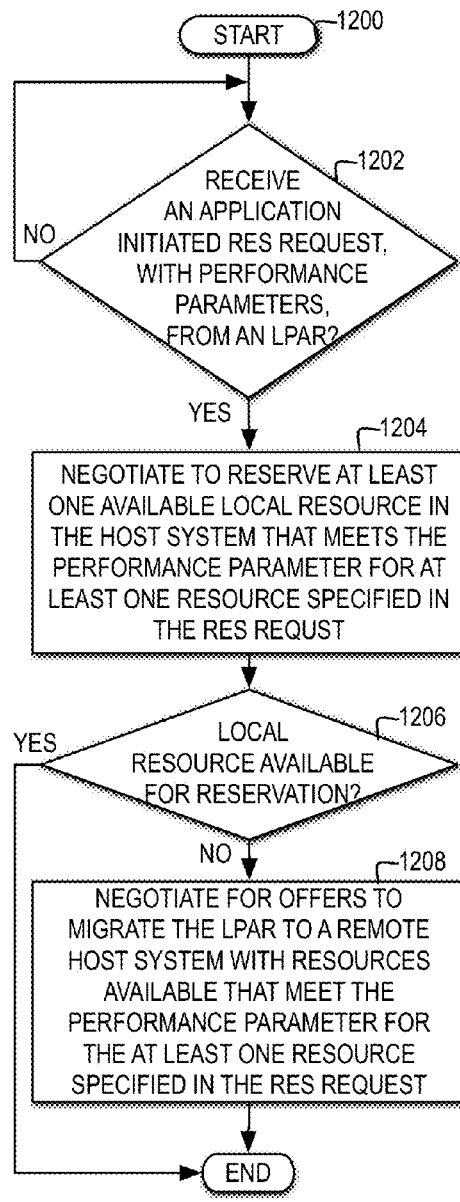
FIG. 12 is a high level logic flowchart illustrating one example of a process and program for a hypervisor managing two levels of negotiations for resources based on an application initiated negotiation for resources meeting performance parameters specified by the application.

In one embodiment, the operations performed by processor 912 may control the operations of flowchart of FIGS. 10, 11, and 12 and other operations described herein. Operations performed by processor 912 may be requested by software, such as operating system and application software, or other code or the steps of one embodiment of the invention might be performed by specific hardware components that contain hardwired logic for performing the steps, or by any combination of programmed computer components and custom hardware components.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, microcode, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 918, a random access memory (RAM), such as RAM 914, a read-only memory (ROM) 916, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, such as computer system 900, partly on the user's computer, as a stand-alone software package, partly on the user's computer and partly on a remote computer or entirely on the remote computer or server. In the latter scenario, the remote computer may be connected to the user's computer through any type of network, such as network 902, through a communication interface, such as network interface 932, over a network link that may be connected, for example, to network 902.

In the example, network interface 932 includes an adapter 934 for connecting computer system 900 to network 902 through a link. Although not depicted, network interface 932 may include additional software, such as device drivers, additional hardware and other controllers that enable communication. When implemented as a server, computer system 900 may include multiple communication interfaces accessible via multiple peripheral component interconnect (PCI) bus bridges connected to an input/output controller, for example. In this manner, computer system 900 allows connections to multiple clients via multiple separate ports and each port may also support multiple connections to multiple clients.

One embodiment of the invention is described herein with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 900, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 900, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 932, the network link to network 902, and network 302 may use electrical, electromagnetic, or optical signals that carry digital data streams. The signals through the various networks and the signals on network 902, the network link to network 902, and network interface 932 which carry the digital data to and from computer system 900, may be forms of carrier waves transporting the information.

In addition, computer system 900 may include multiple peripheral components that facilitate input and output. These peripheral components are connected to multiple controllers, adapters, and expansion slots, such as input/output (I/O) interface 926, coupled to one of the multiple levels of bus 922. For example, input device 924 may include, for example, a microphone, a video capture device, an image scanning system, a keyboard, a mouse, or other input peripheral device, communicatively enabled on bus 922 via I/O interface 926 controlling inputs. In addition, for example, output device 920 communicatively enabled on bus 922 via I/O interface 926 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 9 may vary. Furthermore, those of ordinary skill in the art will appreciate that the depicted example is not meant to imply architectural limitations with respect to the present invention.

With reference now to FIG. 10, a high level logic flowchart depicts a process and program for managing application initiated negotiations for resources with a specified performance parameter. In the example, the process starts at block 1000 and thereafter proceeds to block 1002.

Block 1002 illustrates an application calling an operating system with a resource request for a particular resource and at least one performance parameter. Next, block 1004 illustrates a determination whether a response is received to the resource request from the operating system. Once the application receives a response to the resource request, the process passes to block 1006. Block 1006 illustrates a determination whether a resource request is granted. If a resource request is granted, then the process passes to block 1018. Block 1018 illustrates marking the request as granted and marking the location of the resource grant, whether local or remote, and the process ends.

Returning to block 1006, if a resource request is not granted, then the process passes to block 1008. Block 1008 illustrates a determination whether the response includes at least one of a remote offer and alternate options. If the response does not include at least one of a remote offer and alternate option, then the process passes to block 1020. Block 1020 illustrates calling an error handler to handle the declined resource request, and the process ends.

Returning to block 1008, if the response does include at least one of a remote offer and alternate options, then the process passes to block 1010. Block 1010 illustrates determining whether to accept the remote offer or adjust performance parameters of the resource request to continue negotiating. Next, block 1012 illustrates a determination whether the application accepts an offer. If the application accepts an offer, then the process passes to block 1014. Block 1014 illustrates calling the operating system with an offer acceptance set, and the process passes to block 1018. Returning to block 1012, if the application does not accept an offer, then the process passes to block 1016. Block 1016 illustrates calling the operating system with adjusted performance parameters in the resource request, and the process returns to block 1004.

With reference now to FIG. 11, a high level logic flowchart illustrates one example of a process and program for a negotiation interface of an operating system managing application initiated negotiations for resources meeting performance parameters. In the example, the process starts at block 1102, and thereafter proceeds to block 1104. Block 1104 illustrates a determination whether a resource request call is received from an application. If a resource request call is received from an application, then the process passes to block 1106. Block 1106 illustrates formatting the resource request into a reservation request for the hypervisor. Next, block 1107 illustrates recording the reservation request indexed by application identifier in an outgoing request table. Thereafter, block 1108 illustrates sending the reservation request to the hypervisor. Next, block 1110 illustrates a determination whether the operating system receives a response to the reservation request. Once the operating system receives a response to the reservation request, then the process passes to block 1112. Block 1112 illustrates updating the status of the reservation request with the response. Next, block 1113 illustrates identifying the application identifier assigned to the reservation request responded to in the outgoing request table. Thereafter, block 1114 illustrates sending the response to the request application as a request response, and the process ends.

Referring now to FIG. 12, a high level logic flowchart illustrates one example of a process and program for a hypervisor managing two levels of negotiations for resources based on an application initiated negotiation for resources meeting performance parameters specified by the application. In the example, the process starts at block 1200 and thereafter proceeds to block 1202. Block 1202 illustrates a determination whether a hypervisor receives an application initiated reservation request with performance parameters from an LPAR. If the hypervisor receives an application initiated reservation request with performance parameters from an LPAR, then the process passes to block 1204. Block 1204 illustrates negotiating to reserve at least one available local resource in the host system that meets the performance parameters for at least one resource specified in the reservation request. Next, block 1206 depicts a determination whether any local resource meeting the performance parameters is identified as available for reservation. If at least one local resource meeting the performance parameters is identified as available, then the process ends. If no local resource meeting the performance parameters is identified as available for reservation, then the process passes to block 1208. Block 1208 illustrates negotiating for offers to migrate the LPAR to a remote host system with resources available that meet the performance parameter for the at least one resource specified in the reservation request, and the process ends.

Figure 13A:
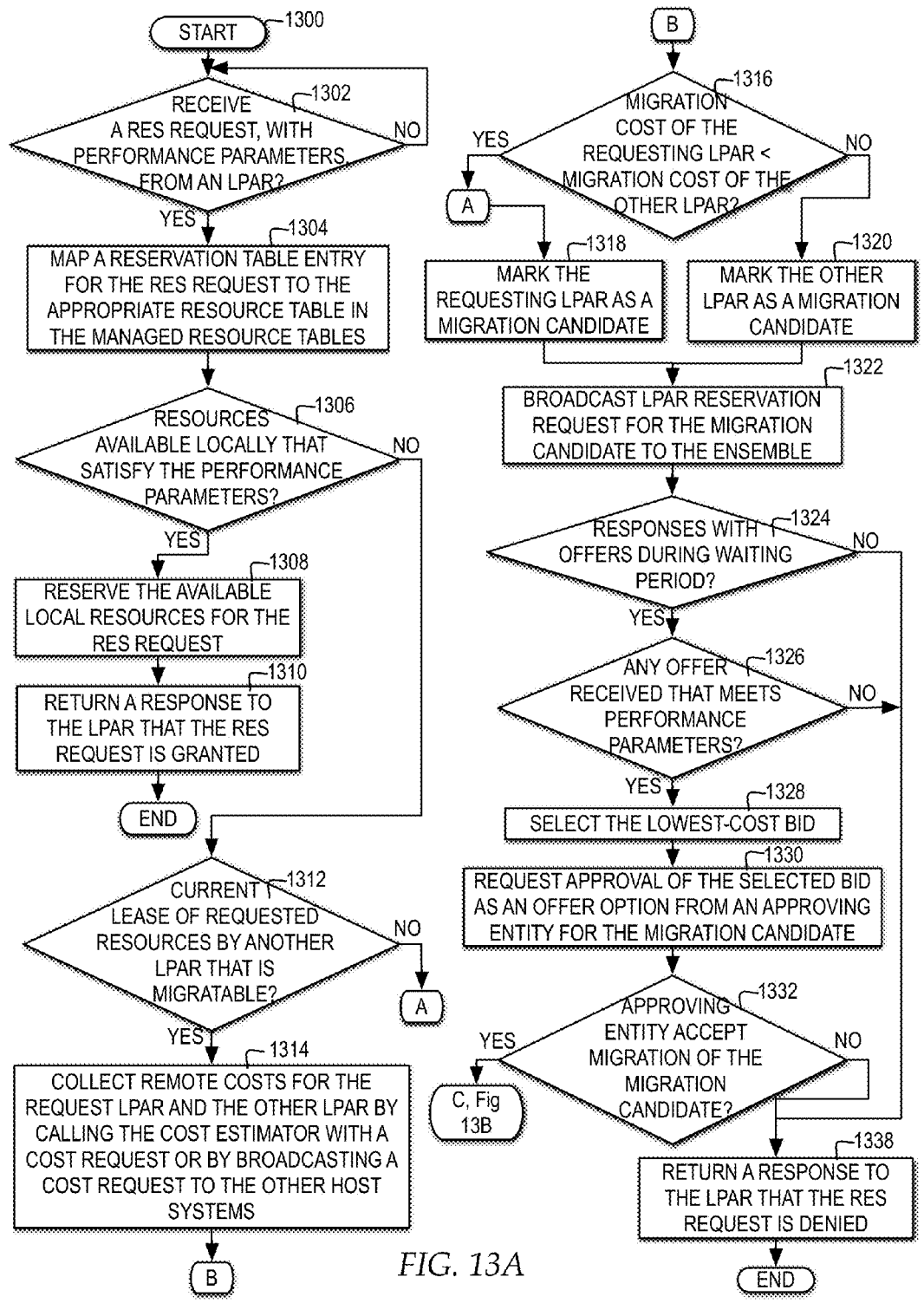
FIG. 13a-13b is a high level logic flowchart illustrating one example of a process and program for a broker agent of a hypervisor managing application initiated negotiations for local or remote resources meeting performance parameters specified by the application.
Figures 13B, 14:
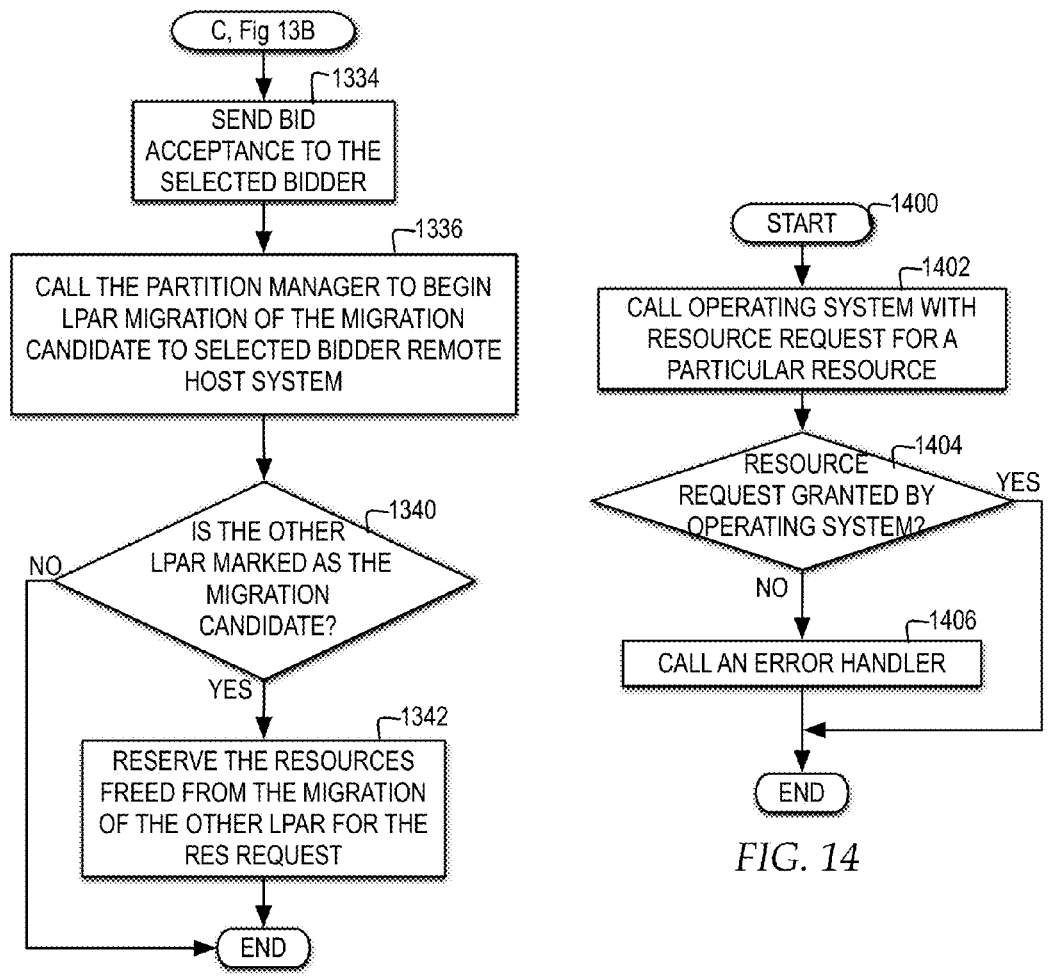
FIG. 14 is a high level logic flowchart illustrating a process and program for managing application initiated negotiations for resources from a legacy application or other application that does not specify a performance parameter in a resource request.

Referring now to FIG. 13a-13b, a high level logic flowchart illustrates one example of a process and program for a broker agent of a hypervisor managing application initiated negotiations for local or remote resources meeting performance parameters specified by the application. In the example, the process starts at block 1300 and thereafter proceeds to block 1302. Block 1302 illustrates a determination of whether the broker agent receives a reservation (res) request, with performance parameters, from a logical partition (LPAR). If the broker agent receives a reservation request, with performance parameters, from an LPAR, then the process passes to block 1304. Block 1304 illustrates mapping a reservation table entry for the reservation request to the appropriate resource table in the managed resource tables. Next, block 1306 illustrates a determination whether there are locally available resources in the mapped to resource table that satisfy the performance parameters of the reservation request. If there are locally available resources in the mapped to resource table that satisfy the performance parameters of the reservation request, the process passes to block 1308. Block 1308 illustrates reserving the available local resources for the reservation request. Next, block 1310 illustrates returning a response to the requesting LPAR that the reservation request is granted, and the process ends.

Returning to block 1306, if there are not locally available resources that satisfy the performance parameters, then the process passes to block 1312. Block 1312 illustrates a determination whether there is currently a local lease of the requested resource by another LPAR that is migratable to a remote host system. In one example, an LPAR may be migratable to a remote host system if the quality of service, cost, or locality requirements of the LPAR allow for the LPAR to be migrated a remote host system. If there is not currently a local lease of the requested resource by another LPAR that is migratable, then the process passes to block 1318. Block 1318 illustrates marking the requesting LPAR as a migration candidate, and the process passes to block 1318.

Returning to block 1312, if there is currently a local lease of the requested resource by another LPAR that is migratable to a remote host system, then the process passes to block 1314. Block 1314 illustrates collecting costs from remote host systems for handling the requesting LPAR and the other LPAR by calling the cost estimator with a cost request or by calling the broker agent to broadcast a cost request to the other host systems. Next, block 1316 illustrates a determination whether the estimated migration cost of the requesting LPAR is less than the estimated migration cost of the other LPAR. If the estimated migration cost of the requesting LPAR is less than the estimated migration cost of the other LPAR, then the process passes to block 1318. As previously described, block 1318 illustrates marking the requesting LPAR as a migration candidate, and the process passes to block 1322. Returning to block 1316, if the estimated migration cost of the requesting LPAR is not less than the estimated migration cost of the other LPAR, then the process passes to block 1320. Block 1320 illustrates marking the other LPAR as a migration candidate, and the process passes to block 1322. By marking the other LPAR within a host system as the migration candidate, the hypervisor next determines whether the other LPAR can be migrated to a remote host system to make room locally for the fulfilling the resource request for the requesting LPAR.

Block 1322 illustrates broadcasting the LPAR reservation request for the migration candidate LPAR to the ensemble. Next, block 1324 illustrates a determination of whether the broker agent receives responses with offers to migrate the LPAR from one or more remote host systems during a waiting period. If no offers are received during the waiting period, then the process passes to block 1338. Block 1338 illustrates returning a response to the requesting LPAR indicating that the reservation request is denied.

Returning to block 1324, if the broker agent receives responses with offers from one or more remote host systems, then the process passes to block 1326. Block 1326 illustrates a determination whether the broker agent receives any offers that meet the performance parameters in the reservation request. If the broker agent determines that none of the offers meet the performance parameters in the reservation requirement, then the process passes to block 1338. If the broker agent determines that at least one offer of the offers meets the performance parameters in the reservation requirement, then the process passes to block 1328. Block 1328 illustrates selecting the lowest cost bid from the offers meeting the performance parameters. Next, block 1330 illustrates requesting approval of the selected bids as an offer option from an approving entity for the migration candidate, and the process passes to block 1332. In one example, where the requesting LPAR is marked as the migration candidate, the approving entity may be the LPAR or the hypervisor. In another example, where the other LPAR is marked as the migration candidate, then the approving entity may be the hypervisor.

Block 1332 illustrates a determination whether the approving entity accepts the migration offer for the LPAR marked as the migration candidate. If the approving entity does not accept the migration offer, then the process passes to block 1338. If the approving entity does accept the migration offer, then the process passes to block 1334. Block 1334 illustrates sending a bid acceptance to the selected bidder host system. Next, block 1336 illustrates calling the partition manager to begin an LPAR migration of the LPAR marked as the migration candidate, to the selected bidder remote host system, and the process passes to block 1340. Block 1340 illustrates a determination whether the other LPAR is marked as the migration candidate. If the other LPAR is not marked as the migration candidate, then the process ends. If the other LPAR is marked as the migration candidate, then the process passes to block 1342. Block 1342 illustrates reserving the resources freed from the migration of the other LPAR for the reservation request, and the process ends.

Referring now to FIG. 14, a high level logic flowchart illustrates a process and program for managing application initiated negotiations for resources from a legacy application or other application that does not specify a performance parameter in a resource request. In the example, the process starts at block 1400 and thereafter proceeds to block 1402. Block 1402 illustrates an application calling an operating system with a resource request for a particular resource. In the example, the application calling the operating system with a resource request, in contrast to the example illustrated in block 1002 of FIG. 10, does not include a performance parameter in the resource request, for one of multiple reasons, such as the application being a legacy application that does not include the functionality to specify a performance parameter for any resource request, the application having the functionality to specify performance parameters for some resource requests but not all resource requests, or the application electing not to specify a performance parameter in the resource request. Next, block 1404 illustrates a determination whether the requested resource is granted by the operating system. If the requested resource is granted by the operating system, then the process ends. If the requested request is not granted by the operating system, then the process passes to block 1406. Block 1406 illustrates calling an error handler, and the process ends. In one example, an error handler called in block 1406 may perform the functions described in FIG. 10 starting at block 1020. In another example, an error handler called in block 1406 may perform the process and program described in FIG. 10 starting at block 1008, where the error handler may read the response from an operating system to determine whether the response includes a remote offer and alternate options. In the example in FIG. 14, for a legacy application or other application that does not specify a performance parameter, the negotiation for resources described in FIGS. 11, 12, and 13 are still performed within an ensemble of host systems, where an operating system, hypervisor, or other component may specify the performance parameter.

Figure 15:
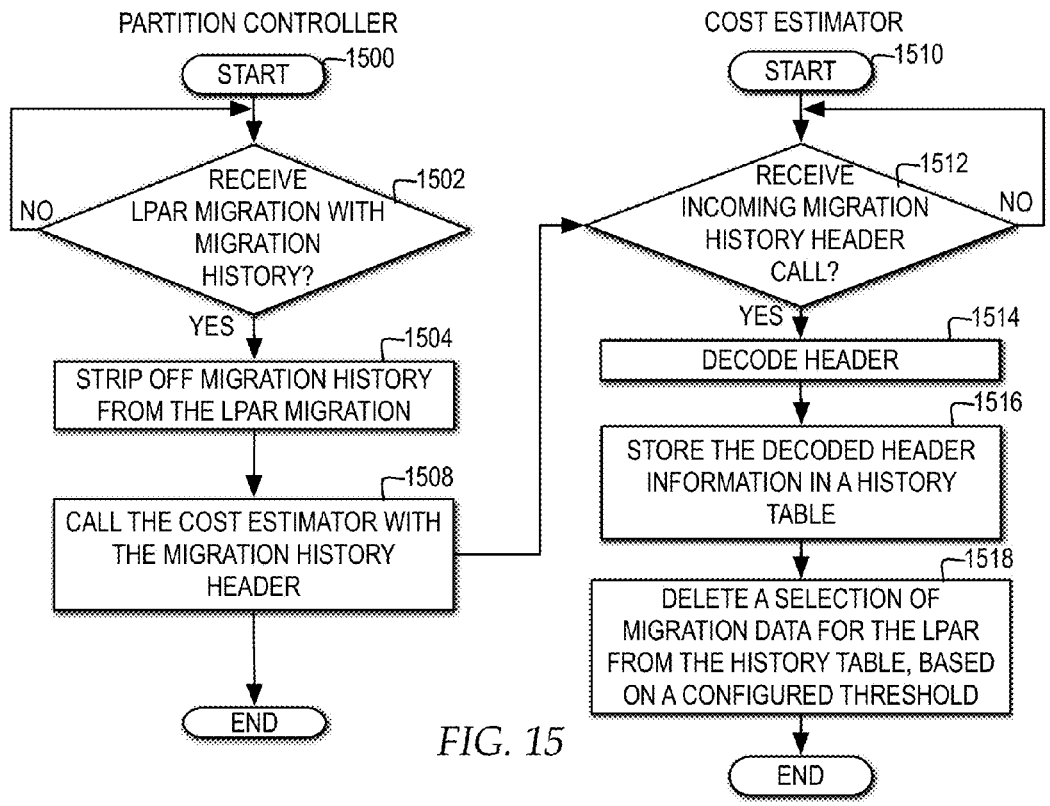
FIG. 15 is a high level logic flowchart illustrating a process and program for a partition controller receiving an LPAR migration and calling a cost estimator with the migration history for the LPAR migration for storing in a cost estimator history table.

FIG. 15 illustrates a high level logic flowchart of a process and program for a partition controller receiving an LPAR migration and calling a cost estimator with the migration history for the LPAR migration for storing in a cost estimator history table. In the example, a partition controller process starts at block 1500 and thereafter proceeds to block 1502. Block 1502 illustrates the partition controller for a host system determining whether an LPAR migration is received with a migration history header. If the partition controller receives an LPAR migration with a migration history header, then the process passes to block 1504. Block 1504 illustrates stripping off the migration history header from the LPAR migration. Thereafter, block 1508 illustrates calling the cost estimator with the migration history header.

As illustrated, a cost estimator process starts at block 1510 and thereafter proceeds to block 1512. Block 1512 illustrates the cost estimator determining whether an incoming migration history header call is received. If an incoming migration history header call is received, then the process passes to block 1514. Block 1514 illustrates decoding the header to identify a source host system, a destination host system, a migrated LPAR identifier, estimated costs, and actual costs. Next, block 1516 illustrates storing the decoded header information in a history table. Thereafter, block 1518 illustrates deleting a selection of old migration data for the identified LPAR from the history table based on a configured threshold, such as a threshold number of entries about the identified LPAR, and the process ends.

Figure 16:
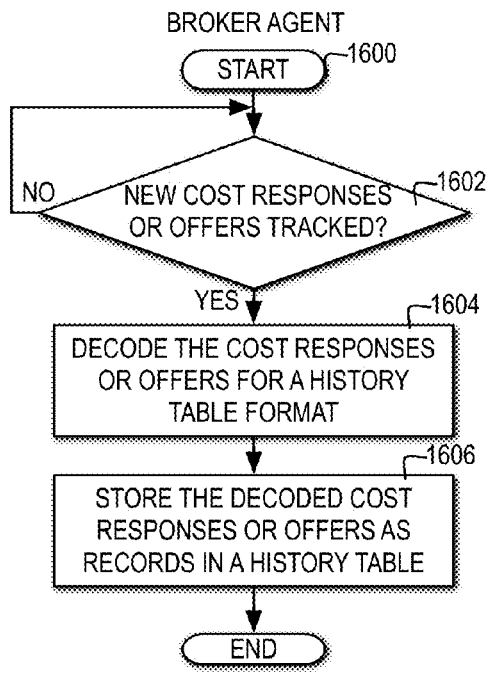
FIG. 16 is a high level logic flowchart of a process and program for updating a history table with estimated and current costs for logical partition migrations gathered during negotiations by a broker agent.

FIG. 16 illustrates a high level logic flowchart of a process and program for updating a history table with estimated and current costs for logical partition migrations gathered during negotiations by a broker agent. In the example, a broker agent process starts at block 1600 and thereafter proceeds to block 1602. Block 1602 illustrates the broker agent determining whether new cost responses or offers are tracked by the mediator. If new cost responses or offers are tracked by the mediator, then the process passes to block 1604. Block 1604 illustrates decoding the cost responses or offers for a history table format. Next, block 1606 illustrates storing the decoded cost responses or offers as records in a history table, and the process ends. In another example, a cost estimator or partition controller may perform the process and program described in FIG. 16.

Figure 17:
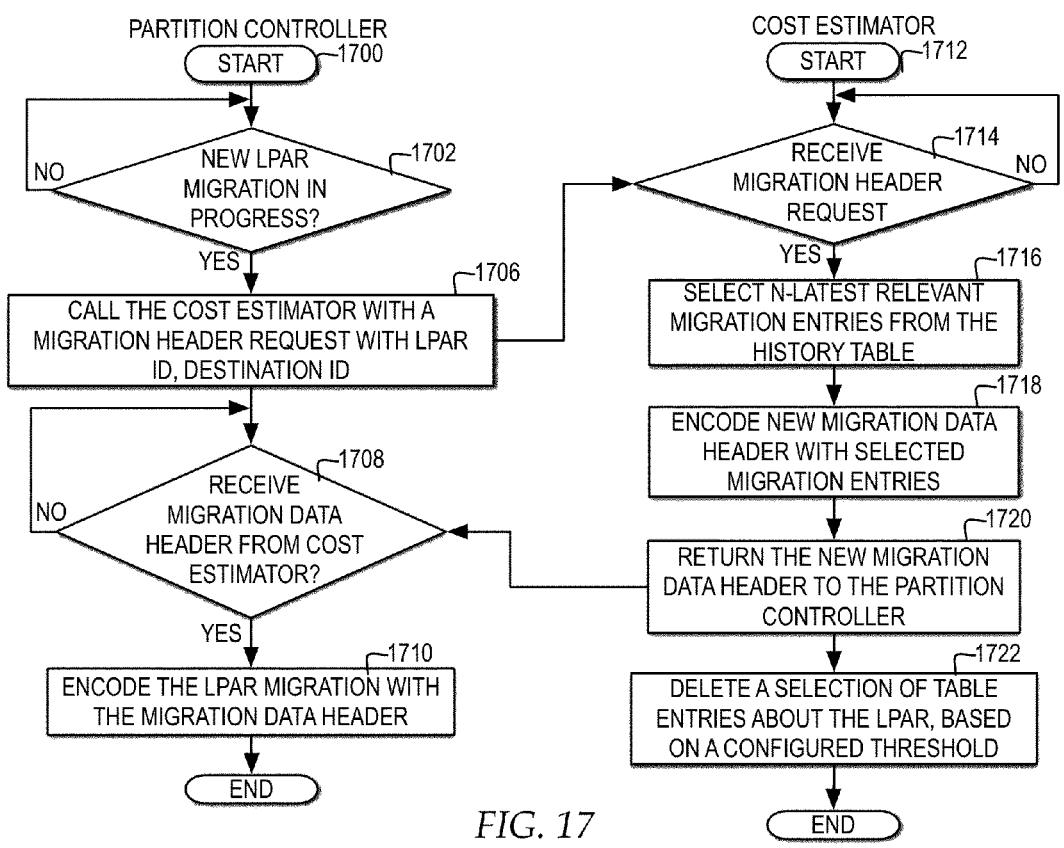
FIG. 17 is a high level logic flowchart of a process and program for a partition controller requesting migration header history for an LPAR to be migrated.

FIG. 17 illustrates a high level logic flowchart of a process and program for a partition controller requesting migration header history for an LPAR to be migrated. In the example, a partition controller process starts at block 1700 and thereafter proceeds to block 1702. Block 1702 illustrates the partition controller for a host system determining whether a new LPAR migration from the host system to a remote system is in progress. If a new LPAR migration is in progress, then the process passes to block 1706. Block 1706 illustrates calling the cost estimator with a migration header request with an LPAR ID for the migrating LPAR and a destination ID for the remote host system receiving the migration. Next, block 1708 illustrates a determination whether a migration data header is received from the cost estimator. If a migration data header is received from the cost estimator, then the process passes to block 1710. Block 1710 illustrates encoding the LPAR migration with the migration data header, and the process ends.

As illustrated, a cost estimator block starts at block 1712 and thereafter proceeds to block 1714. Block 1714 illustrates a determination whether a migration header request is received. If a migration header request is received, then the process passes to block 1716. Block 1716 illustrates selecting the N-latest relevant migration entries from the history table for the LPAR ID or the destination ID, where N is a value configured for the host system. Next, block 1718 illustrates encoding the new migration data header with the selected migration entries, LPAR ID, source ID for the host system, and destination ID for the remote host system. Thereafter, block 1720 illustrates returning the new migration data header to the partition controller. Next, block 1722 illustrates deleting a selection of oldest table entries about the LPAR based on a configured threshold, such as a threshold number of LPAR entries to be stored, and the process ends.

Figure 18:
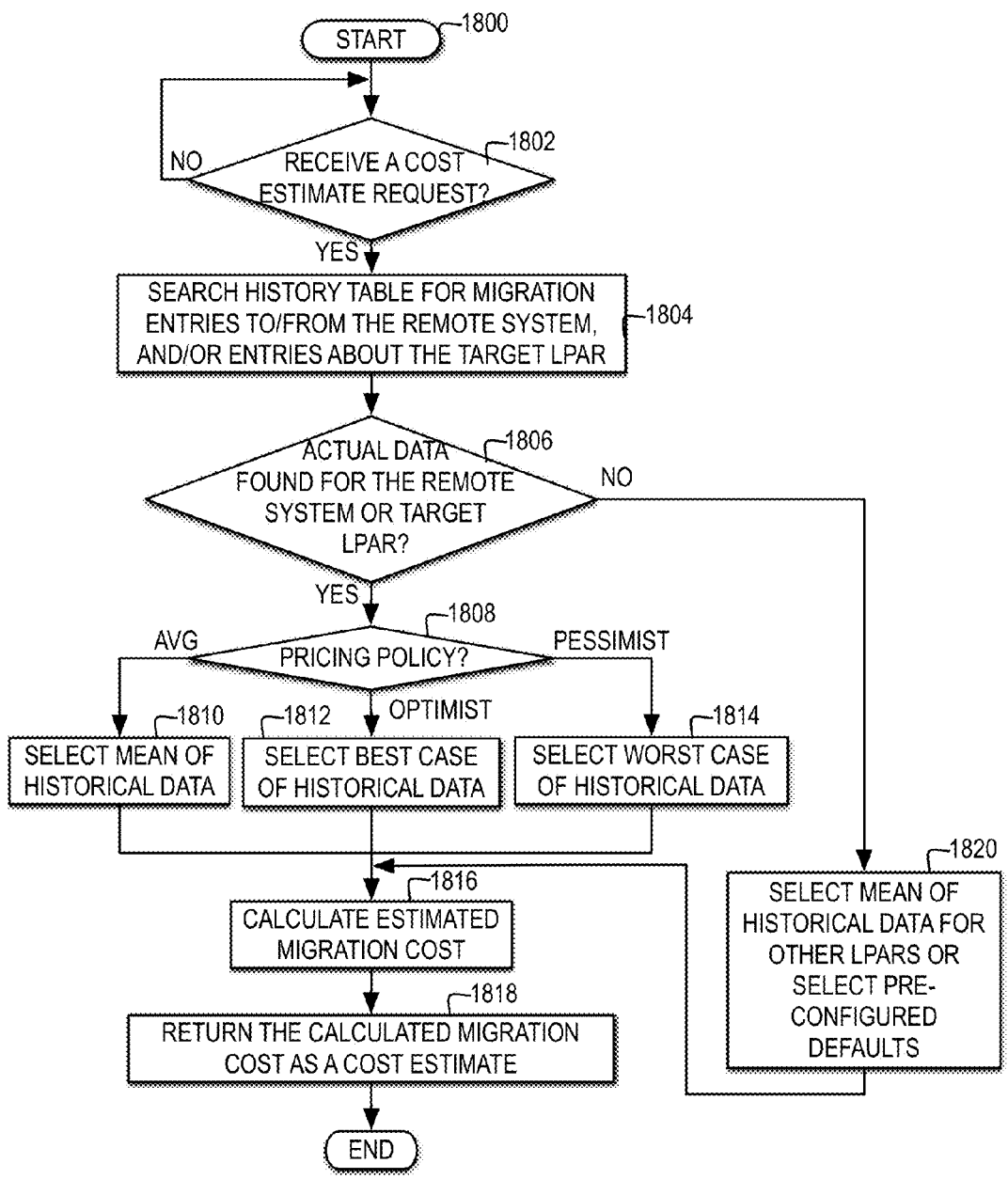
FIG. 18 is a high level logic flowchart of a process and program for a cost estimator estimating the cost for migration of an LPAR.

FIG. 18 illustrates a high level logic flowchart of a process and program for a cost estimator estimating the cost for migration of an LPAR. In the example, the cost estimator process starts at block 1800 and thereafter proceeds to block 1802. Block 1802 illustrates a determination the cost estimator receives a cost estimate request. If the cost estimator receives a cost estimate request, then the process passes to block 1804. Block 1804 illustrates searching the history table for migration entries to or from the remote host system and entries about the target LPAR. Next, block 1806 illustrates a determination whether the cost estimator identifies any actual data for the remote host system or the target LPAR. At block 1806, if the cost estimator does not find any actual data, then the process passes to block 1820. Block 1820 illustrates the cost estimator selecting the mean of historical data for other LPARS or selecting pre-configured default data, and the process passes to block 1816.

Returning to block 1806, if the cost estimator finds data, then the process passes to block 1808. Block 1808 illustrates the cost estimator determining which pricing policy to apply for the host system.

At block 1808, if the cost estimator determines that the average (avg) pricing policy applies, then the process passes to block 1810. Block 1810 illustrates selecting the mean pricing of the historical data found for the remote host system or target LPAR, and the process passes to block 1816.

Returning to block 1808, if the cost estimator determines that the optimist pricing policy applies, then the process passes to block 1812. Block 1812 illustrates selecting the best case pricing the historical data found for the remote host system or target LPAR, and the process passes to block 1816.

Returning to block 1808, if the cost estimator determines that the pessimist pricing policy applies, then the process passes to block 1814. Block 1814 illustrates selecting the worst case pricing of the historical data found for the remote host system or target LPAR, and the process passes to block 1816.

Block 1816 illustrates calculating the migration cost based on the selected historical data. Next, block 1818 illustrates returning the calculated migration cost as a cost estimate, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A host system comprising:
    one or more logical partitions of pools of virtualized resources, wherein an operating system is operated in each of the one or more logical partitions; and
    a hypervisor operative on the host system comprising at least one processor coupled to at least one memory to manage the one or more logical partitions of pools of virtualized resources and operative to negotiate to reserve at least one available local resource in the host system that meets at least one performance parameter for at least one resource specified in a reservation request by a particular logical partition from among the one or more logical partitions, wherein the at least one performance parameter is initially specified in a resource request by a particular application initiating the reservation request from the particular logical partition, wherein the particular logical partition receives the resource request from the particular application through a negotiation interface of an operating system of the particular logical partition, formats the resource request into the reservation request for the hypervisor, records the reservation request by a requesting application identifier of the particular application in an outgoing request table, and submits the reservation request to the hypervisor;
    the hypervisor, responsive to determining that the at least one available local resource is available in the host system, operative to reserve the at least one available local resource for use by the particular application in the particular logical partition and operative to return to the particular logical partition through the negotiation interface, a response that the reservation request is granted; and
    the hypervisor, responsive to determining that the at least one available local resource is not available in the host system, operative to negotiate for offers to migrate the particular logical partition to at least one other host system comprising at least one available remote resource that meets the at least one performance parameter, wherein the at least one other host system is managed by at least one other hypervisor for managing at least one other logical partition comprising at least one other pool of virtualized resources.

2. The host system according to claim 1, further comprising:
    the hypervisor operative to receive the reservation request from the operating system operated in the particular logical partition, wherein the operating system receives the resource request from the particular application specifying a type of resource and the at least one performance parameter comprising a quality of service, a lease start time, a lease duration, and a cost and formats the resource request from the particular application into the reservation request from the particular logical partition.

3. The host system according to claim 2, further comprising:
    the hypervisor operative to receive the reservation request specifying the at least one performance parameter comprising the quality of service of memory, wherein the quality of service of memory comprises at least one of real memory and disk paging.

4. The host system according to claim 2, further comprising:
    the particular operating system operative to receive a call from the particular application with the resource request to the negotiation interface of the particular operating system, wherein the negotiation interface enables the particular operating system to handle application initiated resource requests comprising at least one performance parameter within the particular logical partition.

5. The host system according to claim 1, further comprising:
    the hypervisor, responsive to determining that the at least one available local resource in the host system meets the at least one performance parameter, operative to reserve the at least one available local resource for the particular logical partition; and
    the hypervisor, operative to move the at least one available local resource to the particular logical partition, wherein the operating system operating in the particular logical partition allocates the at least one available local resource to the particular application.

6. The host system according to claim 1, further comprising:
    the hypervisor, responsive to receiving at least one offer to migrate the particular logical partition to at least one other host system managed by at least one other hypervisor comprising at least one available remote resource that meets the at least one performance parameter, operative to send a request to the particular logical partition to approve the at least one offer through the negotiation interface;

the operating system in the particular logical partition operative to receive the request;

the operating system operative to identify the particular application by identifying the requesting application identifier assigned to the reservation request in the outgoing request table;

the operating system operative to submit the request to the particular application, wherein the particular application decides whether to accept the at least one offer and returns a response to the operating system indicating whether to accept the at least one offer;

the operating system operative to return the response to the hypervisor from the particular application on behalf of the particular logical partition; and the hypervisor, responsive to receiving an acceptance of the at least one offer from the particular logical partition, operative to send a bid acceptance to a bidding remote host system of the approved at least one offer and brokering migration of the particular logical partition to the biding remote host system.

7. The host system according to claim 1, further comprising:

the hypervisor operative to broadcast a request for bids on the reservation request via a peer-to-peer management network to the at least one other host system, wherein the host system and the at least one other host system comprise an ensemble.

8. The host system according to claim 1, further comprising:

the hypervisor operative to identify another logical partition managed by the hypervisor in the host system that is assigned at least one local resource meeting the at least one performance parameter and that is migratable to another host system;

the hypervisor operative to collect a first cost of migrating the particular logical partition and a second cost of migrating the another logical partition;

the hypervisor, responsive to determining the first cost is less than the second cost, operative to mark the particular logical partition as a migration candidate;

the hypervisor, responsive to determining the first cost is not less than the second cost, operative to mark the another logical partition as the migration candidate; and the hypervisor operative to broadcast a request for bids for migrating the migration candidate to the at least one other host system.

9. A computer program product for managing requests for resources, said computer program product tangibly embodied in a non-transitory computer-readable storage medium and comprising computer executable instructions which cause a computer to:

negotiate, by a hypervisor, to reserve at least one available local resource in a host system that meets at least one performance parameter for at least one resource specified in a reservation request by a particular logical partition from among one or more logical partitions of virtualized pools of resources managed by the hypervisor in the host system, wherein the at least one performance parameter is initially specified in a resource request by a particular application initiating the reservation request from the particular logical partition, wherein the particular logical partition receives the resource request from the particular application through a negotiation interface of an operating system of the particular logical partition, formats the resource request into the reservation request for the hypervisor, records the reservation request by a requesting application identifier of the particular application in an outgoing request table, and submits the reservation request to the hypervisor;

responsive to determining that the at least one available local resource is available in the host system, reserve, by the hypervisor, the at least one available local resource for use by the particular application in the particular logical partition and return, by the hypervisor, to the particular logical partition through the negotiation interface, a response that the reservation request is granted; and responsive to determining that the at least one available local resource is not available in the host system, negotiate, by the hypervisor for offers to migrate the particular logical partition to at least one other host system comprising at least one available remote resource that meets the at least one performance parameter, wherein the at least one other host system is managed by at least one other hypervisor that manages one or more other logical partitions of virtualized pools of resources.

10. The computer program product according to claim 9, further comprising computer executable instructions which cause a computer to:

receive the reservation request from the operating system of the particular logical partition, wherein the operating system receives the resource request from the particular application specifying a type of resource and the at least one performance parameter comprising a quality of service, a lease start time, a lease duration, and a cost and formats the resource request from the particular application into the reservation request from the particular logical partition.

11. The computer program product according to claim 9, further comprising computer executable instructions which cause a computer to:

responsive to determining that the at least one available local resource in the host system meets the at least one performance parameter, reserve the at least one available local resource for the particular logical partition; and move the at least one available local resource to the particular logical partition, wherein the operating system of the particular logical partition allocates the at least one available local resource to the particular application.

12. The computer program product according to claim 9, further comprising computer executable instructions which cause a computer to:

responsive to the hypervisor receiving at least one offer to migrate the particular logical partition to at least one other host system managed by at least one other hypervisor comprising at least one available remote resource that meets the at least one performance parameter, send a request from the hypervisor to the particular logical partition to approve the at least one offer through the negotiation interface;

receive, by the operating system in the particular logical partition, the request;

identify, by the operating system, the particular application by identifying the requesting application identified assigned to the reservation request in the outgoing request table;

submit, by the operating system, the request to the particular application, wherein the particular application decides whether to accept the at least one offer and returns a response to the operating system indicating whether to accept the at least one offer;

return, by the operating system, the response to the hypervisor from the particular application on behalf of the particular logical partition; and responsive to the hypervisor receiving an acceptance of the at least one offer from the particular logical partition, send, by the hypervisor, a bid acceptance to a bidding remote host system of the approved at least one offer and brokering migration of the particular logical partition to the biding remote host system.

* * * * *